United States Patent
Kasahara et al.

(10) Patent No.: US 6,438,076 B1
(45) Date of Patent: Aug. 20, 2002

(54) INFORMATION RECORDING OR INFORMATION RECORDING/ REPRODUCING DEVICE

(75) Inventors: Kenji Kasahara; Shigeaki Koike; Yoji Ishii; Naoki Inoue, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/996,016

(22) Filed: Dec. 22, 1997

(30) Foreign Application Priority Data

Dec. 27, 1996 (JP) .............................................. 8-349870

(51) Int. Cl.⁷ ................................................ G11B 7/00
(52) U.S. Cl. ................................ 369/44.14; 369/44.28; 369/77.2
(58) Field of Search ........................... 369/44.14, 44.11, 369/44.27, 44.28, 47, 58, 77.2, 47.1, 53.1, 75.1, 76

(56) References Cited

U.S. PATENT DOCUMENTS

| | | | |
|---|---|---|---|
| 4,849,819 A | | 7/1989 | Ishiguro et al. ......... 358/213.13 |
| 4,916,684 A | * | 4/1990 | Odawara et al. .............. 369/43 |
| 5,010,538 A | * | 4/1991 | Takeda et al. ............ 369/44.36 |
| 5,062,099 A | * | 10/1991 | Odawara et al. ....... 369/75.2 X |
| 5,144,611 A | * | 9/1992 | Engler et al. .................. 369/71 |
| 5,479,388 A | * | 12/1995 | Gondou et al. ...... 369/44.25 X |
| 5,537,271 A | * | 7/1996 | Kumai et al. .......... 369/77.2 X |

FOREIGN PATENT DOCUMENTS

| | | |
|---|---|---|
| DE | 41 08 307 A1 | 9/1991 |
| EP | 0 271 869 A1 | 6/1988 |
| JP | 57-142078 A | 9/1982 |
| JP | 62-266986 A | 11/1987 |
| JP | 06-325558 A | 11/1994 |
| JP | 08-65619 A | 8/1996 |

\* cited by examiner

*Primary Examiner*—Muhammad Edun
(74) *Attorney, Agent, or Firm*—Frommer Lawrence & Haug LLP; William S. Frommer

(57) ABSTRACT

Disclosed is an information recording/reproducing device using an upright disk-like recording medium contained in a cartridge, wherein an objective lens is stably moved in the tracking direction with less undesirable displacement and also the entire optical head portion including the objective lens is prevented from being undesirably moved. The device includes a disk mounting portion on which a disk contained in a cartridge is mounted with a recording surface portion located within a vertical plane, an optical head portion having an objective lens opposed to the recording surface portion of the disk, and an optical head drive portion, a tracking control portion, and a cartridge housing portion for housing and supporting the cartridge containing the disk when the disk is mounted on the disk mounting portion. The cartridge containing the disk is inserted into the cartridge housing portion in the direction crossing the vertical direction and the movement of the objective lens by the tracking control portion is performed in the direction perpendicular to the vertical direction.

8 Claims, 15 Drawing Sheets

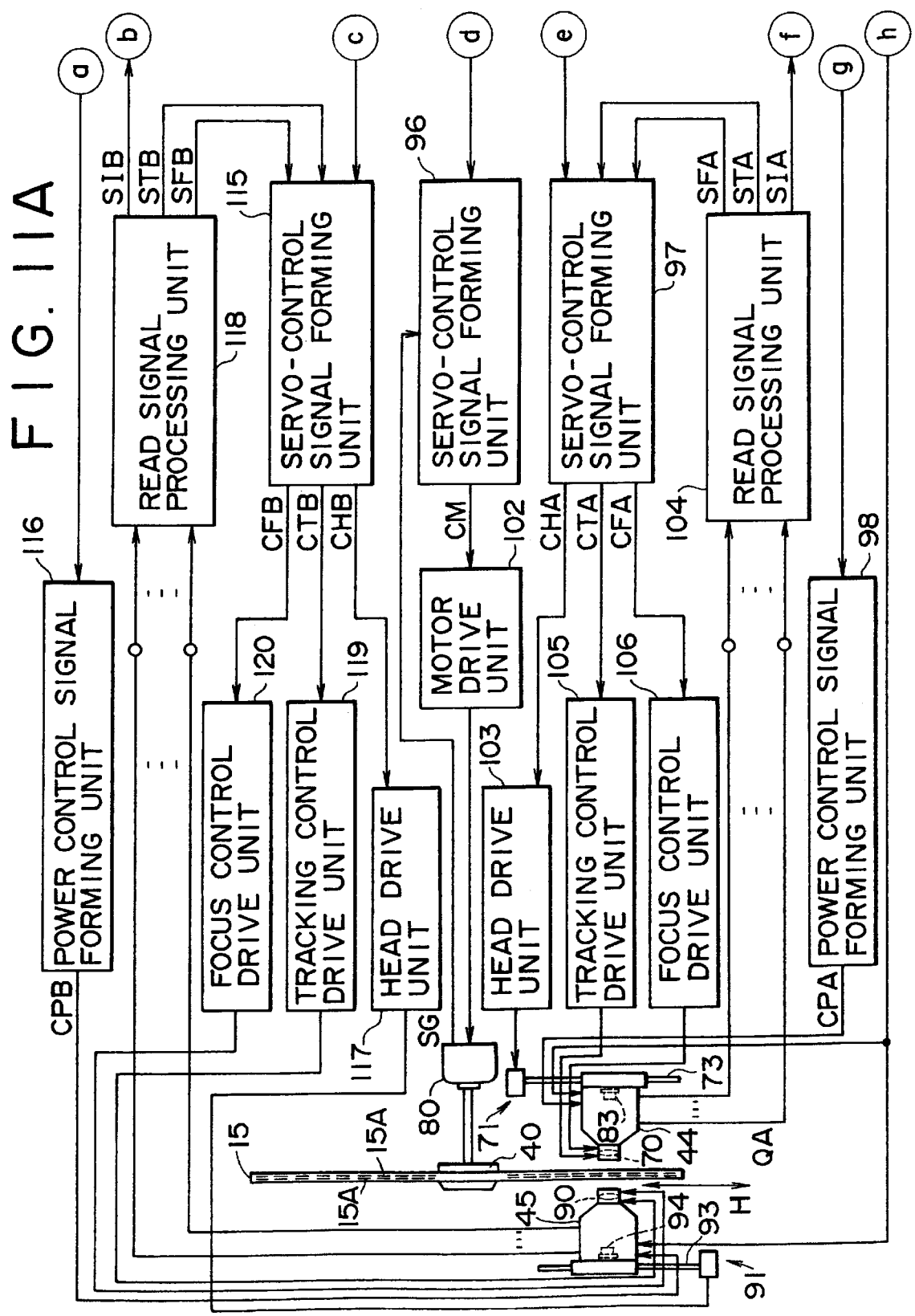

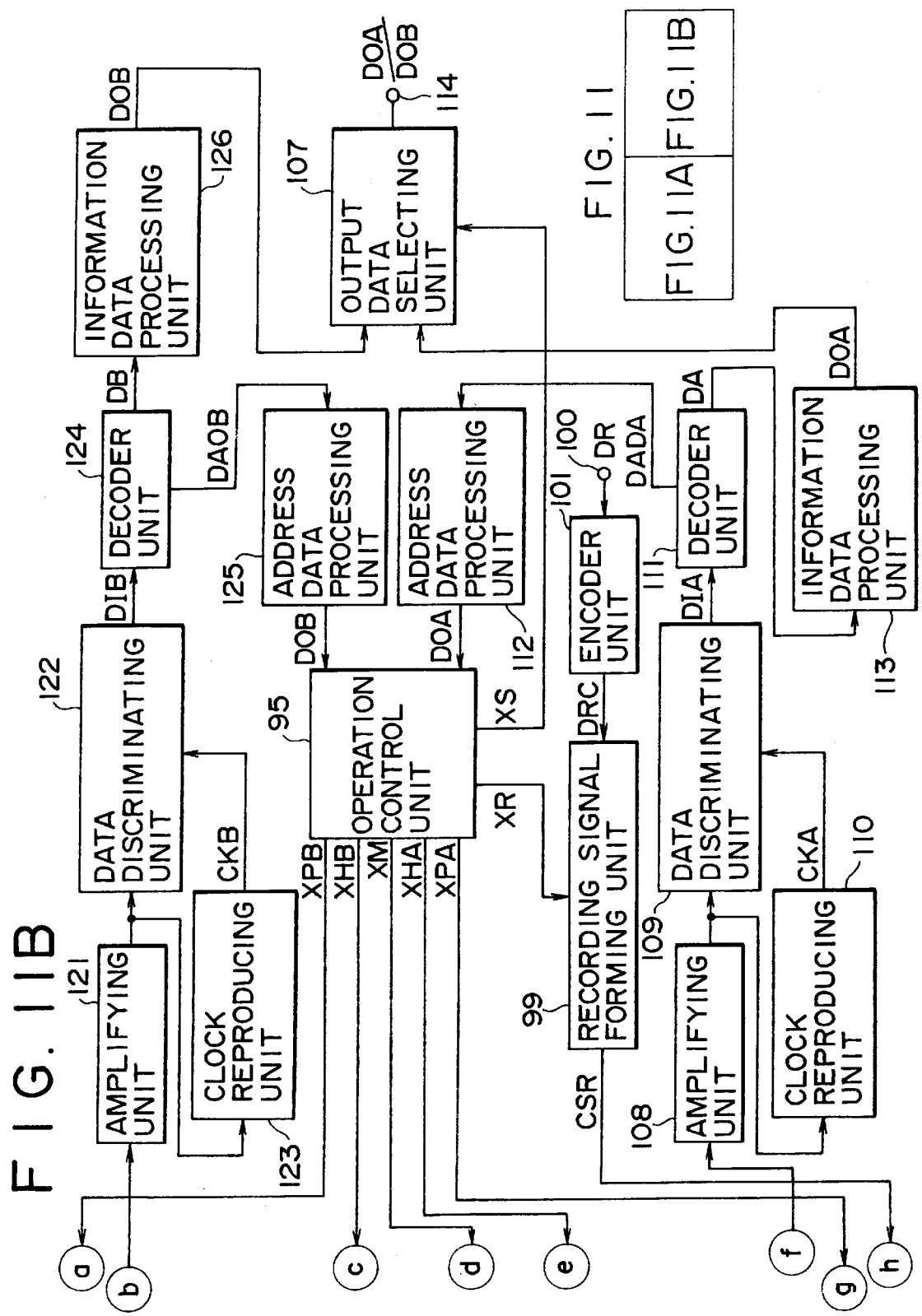

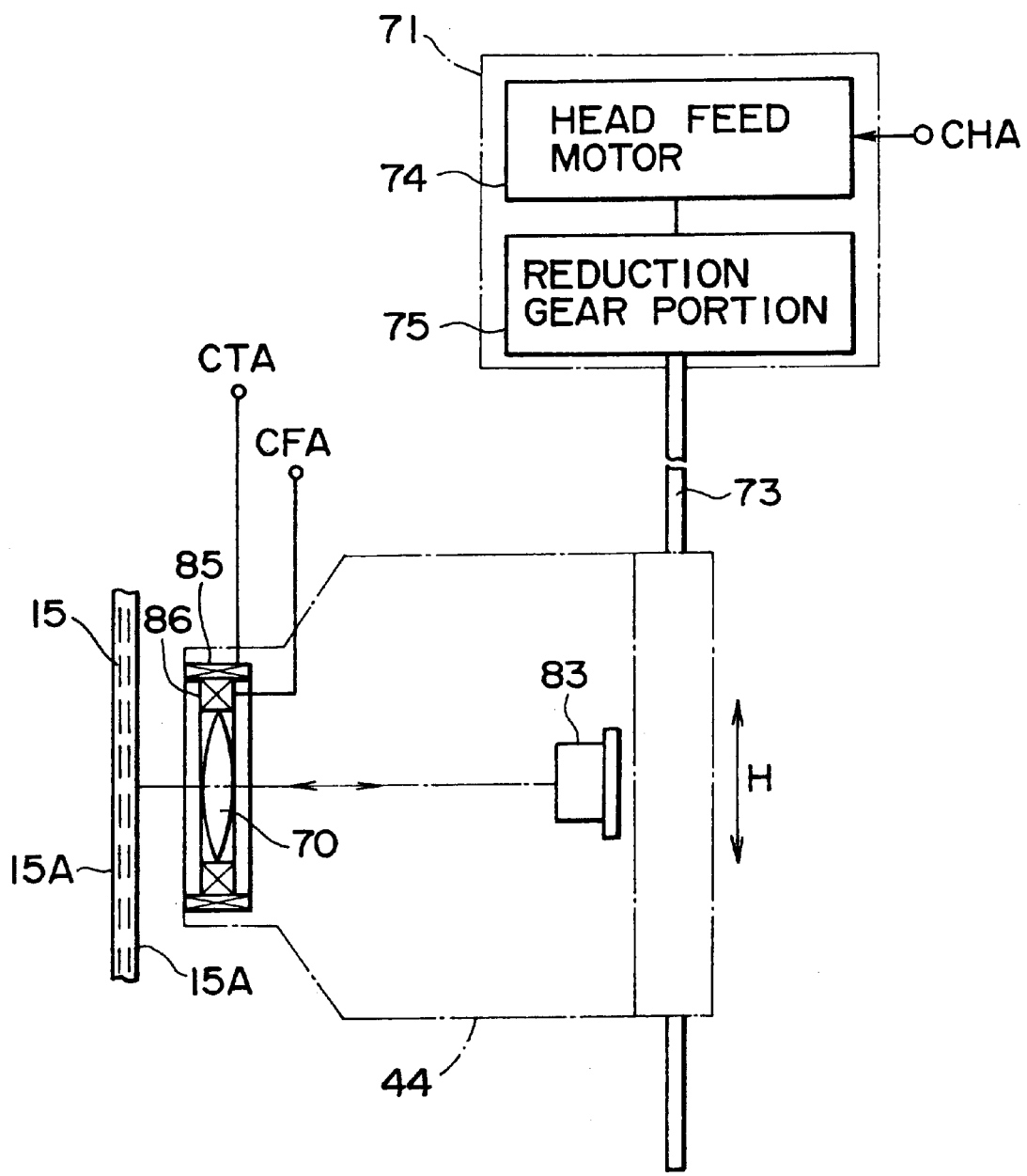

INFORMATION RECORDING OR INFORMATION RECORDING/REPRODUCING DEVICE

BACKGROUND OF THE INVENTION

The present invention relates to an information recording or information recording/reproducing device including a cartridge containing a disk-like recording medium, a disk mounting portion on which the disk-like recording medium contained in the cartridge is mounted with a recording surface portion thereof located substantially within a vertical plane in such a manner as to be rotatable with a central portion of the recording surface portion taken as a rotational center, and an optical head disposed opposite to the recording surface portion located within the vertical plane in such a manner as to be movable in the radial direction of the disk-like recording medium, wherein information is recorded or read into or from the recording surface portion by a light beam emitted from the optical head.

As one example of disk-like recording media, there has been practically used a so-called writable disk-like recording medium into or from which information can be recorded or reproduced using a light beam even in the form of being available as a finished product. In such a writable disk-like recording medium, generally, a recording surface portion is provided on a surface of a body around a central hole, and information is recorded in the recording surface portion as a number of annular recording tracks formed around the central hole.

The practical writable disk-like recording medium is generally used in a state in which it is contained in a cartridge. The cartridge is formed into, for example, a flattened rectangular parallelopiped shape having a relatively small thickness, and it has an opening portion and a movable lid member for opening/closing the opening portion. When the movable lid member of the cartridge opens the opening portion thereof, the disk-like recording medium contained in the cartridge are exposed, at a central hole portion and part of a recording surface portion extended around the central portion, to the exterior from the cartridge through the opening portion.

In recording or reproducing information into or from the disk-like recording medium contained in such a cartridge, the recording medium contained in the cartridge is mounted with its central hole engaged to a disk mounting portion provided on an information recording or an information recording/reproducing device in a state in which the movable lid member provided on the cartridge opens the opening portion provided in the cartridge. At this time, the cartridge containing the recording medium is contained in and supported by a cartridge housing portion provided in the information recording or information recording/reproducing device.

When the disk mounting portion is rotated by a disk drive portion provided on the information recording or information recording/reproducing device, the disk-like recording medium mounted on the disk mounting portion is rotated at a specific rotational speed, and information is recorded or read into or from the recording surface portion of the rotating disk-like recording medium by a light beam incident on the recording surface portion.

In order to make incident a light beam on the recording surface portion of the rotating disk-like recording medium, an optical head is disposed with an objective lens being opposite to the recording surface portion of the disk-like recording medium. The optical head includes a light emitting portion for emitting light for forming a light beam, a light beam forming portion for forming a light beam from the light emitted from the light emitting portion, and the objective lens for introducing the light beam formed at the light beam forming portion to the exterior in a focus state. When information is thus recorded or read by making incident the light beam through the objective lens of the optical head on the recording surface portion of the rotating disk-like recording medium, the light beam incident on the disk-like recording medium is generally subjected to a tracking servo-control, focus servo-control and incident position movement control.

The tracking servo-control is to usually, suitably keep a so-called tracking state in which a light beam incident on the recording surface portion of the rotating disk-like recording medium reaches a portion where an annular recording track is to be formed or a portion where the annular recording track is already formed. Such a tracking servo-control is performed by a tracking control means, wherein a position of the objective lens of the optical head is adjusted by fine movement thereof in the tracking direction for displacing a spot of a light beam formed on the recording surface portion in the direction (tracking direction) where the spot passes through a portion where an annular recording track is to be formed or a portion where the annular recording track is already formed.

The focus servo-control is to allow a light beam incident on the recording surface portion of the rotating disk-like recording medium to usually reach, in a suitable focus state, a portion where an annular recording track is to be formed or a portion where the annular recording track is already formed. Such a focus servo-control is performed by a focus control means, wherein a position of the objective lens of the optical head is adjusted by fine movement thereof close to or apart from the recording surface portion.

The incident position movement control is to move an incident position of a light beam incident on the recording surface portion of the rotating disk-like recording medium in the radial direction (which corresponds to the tracking direction) of the disk-like recording medium along with rotation of the disk-like recording medium. Such a control is performed by a head movement control means allowing the optical head itself to be moved along the radial direction of the disk-like recording medium.

The information recording or information recording/reproducing device for performing recording of information or recording/reproducing of information using the writable disk-like recording medium contained in the cartridge includes, as described above, the cartridge housing portion, disk mounting portion, disk drive portion, and optical head, tracking control means, focus control means, and head movement control means. As is known, the information recording or information recording/reproducing device using the writable disk-like recording medium contained in the cartridge is integrated with a video camera device, microphone device, an image monitor device, a speaker device and the like, to constitute a portable type video and audio recording or recording/reproducing apparatus.

In such a portable type video and audio recording or recording/reproducing apparatus, a video information signal obtained by performing image pick-up using the video camera device and an audio information signal obtained by the microphone device are recorded in the disk-like recording medium by the information recording or information recording/reproducing device, and further the video information signal and audio information signal recorded in the disk-like recording medium are reproduced by the information recording/reproducing device. The video information signal thus reproduced is supplied to the image monitor device to create a reproduced image, and the audio information signal thus reproduced is supplied to the speaker device to create a reproduced audio. Further, in recording the video information signal from the video camera device and the audio information signal from the microphone device are recorded in the disk-like recording medium by the information recording or information recording/reproducing device, these signals can be easily, freely edited, and further an information signal thus edited and recorded in the disk-like recording medium can be immediately reproduced in a significantly rapid manner.

In the information recording device using the writable disk-like recording medium contained in the cartridge and being incorporated in the portable type video and audio recording apparatus, or in the information recording/reproducing device using the writable disk-like recording medium contained in the cartridge and being incorporated in the portable type video and audio recording/reproducing apparatus, it is desirable to adopt a structure in which the disk-like recording medium contained in the cartridge is mounted on the disk mounting portion in a state that the recording surface portion is located substantially within a vertical plane, that is, in a so-called "upright" posture from the viewpoints of miniaturization of the entire apparatus and improvement in operability. Accordingly, the information recording device containing the disk-like recording medium in the "upright" posture is used for the portable type video and audio recording apparatus, and the information recording/reproducing device containing the disk-like recording medium in the "upright" posture is used for the portable video and audio recording/reproducing apparatus.

In the information recording or information recording/reproducing device containing the disk-like recording medium in the "upright" posture, the cartridge containing the disk-like recording medium is inserted in the cartridge housing portion in a state in which the recording surface portion of the disk-like recording medium is located substantially within a vertical plane and is then positioned in and supported by the cartridge housing portion. At this time, the movable lid member provided on the cartridge is moved, along with insertion of the cartridge into the cartridge housing portion, from a position where the movable lid member closes the opening portion formed in the cartridge to a position where it opens the opening portion. Thus, the disk-like recording medium in the cartridge which is supported by the cartridge housing portion with its opening portion being opened, is mounted on the disk mounting portion in the state in which the recording surface portion is located substantially within the vertical plane.

In such a state in which the disk-like recording medium is mounted on the disk mounting portion with its recording surface portion located substantially within the vertical plane, the head movement control means performing the incident position movement allows the optical head having the objective lens opposed to the recording surface portion of the disk-like recording medium to be moved within a vertical plane parallel to the vertical plane within which the recording surface portion of the disk-like recording medium is located. The tracking control means for performing the tracking servo-control, for example, allows the objective lens provided on the optical head to be finely moved within a vertical plane parallel to the vertical plane within which the recording surface portion of the disk-like recording medium is located. Further, the focus control means for performing the focus servo-control allows the objective lens provided on the optical head to be finely moved in the direction perpendicular to the vertical plane within which the recording surface portion of the disk-like recording medium is located.

When the cartridge containing the disk-like recording medium is inserted in the cartridge housing portion in the information recording or information recording/reproducing device, the movable lid member provided on the cartridge is moved, along with the insertion of the cartridge, from a position where the movable lid member closes the opening portion provided in the cartridge to a position where it opens the opening portion. At this time, the movement direction of the movable lid member is generally perpendicular to the insertion direction of the cartridge into the cartridge housing portion. The movement of the movable lid member provided on the cartridge along with the insertion of the cartridge into the cartridge housing portion is performed by movement, along with insertion of the cartridge into the cartridge housing portion, of a lid member control portion provided in the cartridge housing portion in such a manner as to be engaged with the movable lid member of the cartridge in this case, to relatively simply, certainly move the movable lid member, it is desirable to adopt a configuration that the lid member control portion allows the movable lid member to be moved in the direction perpendicular to the insertion direction of the cartridge into the cartridge housing portion.

In such a configuration that the movement direction of the movable lid member provided on the cartridge from a position where it closes the opening portion provided in the cartridge to a position where it opens the opening portion is perpendicular to the insertion direction of the cartridge into the cartridge housing portion, the optical head opposed to the recording surface portion of the disk-like recording medium mounted with its central hole engaged to the disk mounting portion in a state in which the opening portion of the cartridge is opened, is moved radially of the disk-like recording medium along the direction parallel to the insertion direction of the cartridge into the cartridge housing portion. Accordingly, the tracking direction of the disk-like recording medium mounted on the disk mounting portion is also in parallel to the insertion direction of the cartridge into the cartridge housing portion.

On the other hand, in the information recording device using the "upright" disk-like recording medium contained in the cartridge and being incorporated in the portable type video and audio recording apparatus, or in the information recording/reproducing device using the "upright" disk-like recording medium contained in the cartridge and being incorporated in the portable type video and audio recording/reproducing apparatus, the insertion of the cartridge containing the disk-like recording medium into the cartridge housing portion in the state in which the recording surface portion of the disk-like recording medium is located substantially within the vertical plane is generally performed along the vertical direction, particularly, from top to bottom.

This may be considered to be similar to insertion of a tape cassette into a cassette housing portion from top to bottom in an information recording/reproducing device using the tape cassette containing a magnetic tape and being incorporated in a widely available portable type video and audio recording/reproducing apparatus.

In the information recording or information recording/reproducing device using the "upright" disk-like recording medium contained in the cartridge, however, if the insertion of the cartridge containing the disk-like recording medium into the cartridge housing portion is performed along the vertical direction, then the movement direction of the optical head opposed to the recording surface portion of the disk-like recording medium mounted on the disk mounting portion along the radial direction of the disk-like recording medium and the tracking direction of the disk-like recording medium mounted on the disk mounting portion are performed along the vertical direction, as a result of which the optical head may be in a state in which it tends to be moved in an undesirable manner.

In the information recording device using the "upright" disk-like recording medium contained in the cartridge and being incorporated in the portable type video and audio recording apparatus or in the information recording/reproducing device using the "upright" disk-like recording medium and being incorporated in the portable type video and audio recording/reproducing apparatus, the tracking control means for performing the tracking servo-control, for example, allows the objective lens provided on the optical head to be finely moved in the tracking direction within a vertical plane parallel to the vertical plane within which the recording surface portion of the disk-like recording medium is located. Accordingly, if the tracking is performed along the vertical direction, the objective lens moved in the tracking direction is susceptible to a stationary displacement due to the gravity thereof. That is, the objective lens is in an unstable state easily causing an undesirable displacement. In particular, if the objective lens allowing a recording light beam for recording information in the recording surface portion of the disk-like recording medium to be made incident thereon is in a state in which it is susceptible to a stationary displacement due to the gravity thereof, it fails to perform a suitable recording action.

Further, upon practical use of such an information recording or information recording/reproducing device, it is known that a vertical vibration is mainly applied thereto. Accordingly, if the movement of the optical head along the radial direction of the disk-like recording medium and the tracking of the disk-like recording medium are performed along the vertical direction, the entire optical head and the objective lens provided on the optical head are easily affected by the vertical vibration, thus failing to perform a suitable recording action.

SUMMARY OF THE INVENTION

An object of the present invention is to provide an information recording or information recording/reproducing device using an "upright" disk-like recording medium contained in a cartridge, including a cartridge housing portion in which the cartridge containing the disk-like recording medium is inserted in a posture in which a recording surface portion of the disk-like recording medium is substantially located within a vertical plane, a disk mounting portion on which the disk-like recording medium contained in the cartridge supported by the cartridge housing portion is mounted in a state in which the recording surface portion is substantially located within a vertical plane, and an optical head portion having an objective lens opposed to the recording surface portion of the disk-like recording medium mounted on the disk mounting portion, wherein the objective lens can be stably moved with less undesirable displacement in the tracking direction within a vertical plane parallel to the vertical plane within which the recording surface portion of the disk-like recording medium is located, and the entire optical head portion including the objective lens is avoided from being undesirably moved.

To achieve the above object, according a first aspect of the present invention, there is provided an information recording device including:

a disk mounting portion on which a disk-like recording medium contained in a cartridge is mounted with a recording surface portion of the disk-like recording medium located substantially within a vertical plane in such a manner as to be rotatable with a central portion of the recording surface portion taken as a rotational center;

an optical head portion including an objective lens disposed opposite to the recording surface portion of the disk-like recording medium mounted on the disk mounting portion and allowing a light beam for recording information to be made incident on the recording surface portion through the objective lens;

an optical head drive portion for moving the optical head portion along the radial direction of the disk-like recording medium mounted on the disk mounting portion;

a tracking control portion for moving the objective lens in the direction substantially parallel to the movement direction of the optical head portion along the radial direction of the disk-like recording medium, thereby controlling a tracking state in which the light beam incident through the objective lens on the recording surface portion of the disk-like recording medium mounted on the disk mounting portion reaches a recording track in the recording surface portion; and a cartridge housing portion for housing and supporting the cartridge containing the disk-like recording medium when the disk-like recording medium is mounted on the disk mounting portion;

wherein when the disk-like recording medium is mounted on the disk mounting portion, the cartridge containing the disk-like recording medium is inserted in the cartridge housing portion in the direction crossing the vertical direction, and the movement of the objective lens by the tracking control portion with respect to the disklike recording medium mounted on the disk mounting portion in the state in which the cartridge is supported by the cartridge housing portion is performed in the direction substantially perpendicular to the vertical direction.

To achieve the above object, according to a second aspect of the present invention, there is provided an information recording/reproducing device including:

a disk mounting portion on which a disk-like recording medium contained in a cartridge is mounted with a recording surface portion of the disk-like recording medium located substantially within a vertical plane in such a manner as to be rotatable with a central portion of the recording surface portion taken as a rotational center;

an optical head portion including an objective lens disposed opposite to the recording surface portion of the disk-like recording medium mounted on the disk mounting portion and selectively making incident a light beam for recording information or a light beam for reading information on the recording surface portion through the objective lens;

an optical head drive portion for moving the optical head portion along the radial direction of the disk-like recording medium mounted on the disk mounting portion;

a tracking control portion for moving the objective lens in the direction substantially parallel to the movement direction of the optical head portion along the radial direction of the disk-like recording medium, thereby controlling a tracking state in which the light beam incident through the objective lens on the recording surface portion of the disk-like recording medium mounted on the disk mounting portion reaches a recording track in the recording surface portion; and a cartridge housing portion for housing and supporting the cartridge containing the disk-like recording medium when the disk-like recording medium is mounted on the disk mounting portion;

wherein when the disk-like recording medium is mounted on the disk mounting portion, the cartridge containing the disk-like recording medium is inserted in the cartridge housing portion in the direction crossing the vertical direction, and the movement of the objective lens by the tracking control portion with respect to the disk-like recording medium mounted on the disk mounting portion in the state in which the cartridge is supported by the cartridge housing portion is performed in the direction substantially perpendicular to the vertical direction.

In the above information recording or information recording/reproducing device of the present invention, preferably, when the disk-like recording medium is mounted on the disk mounting portion, the cartridge containing the disk-like recording medium is inserted in the cartridge housing portion in the direction substantially perpendicular to the vertical direction.

In the information recording or information recording/reproducing device of the present invention, when the disk-like recording medium contained in the cartridge is mounted on the disk mounting portion, the cartridge containing the disk-like recording medium is inserted in the cartridge housing portion in the direction crossing the vertical direction, for example, in the direction substantially perpendicular to the vertical direction. As a result, the movement of the optical head opposed to the recording surface portion of the disk-like recording medium mounted on the disk mounting portion along the radial direction of the disk-like recording medium in a state in which the cartridge is supported by the cartridge housing portion and the tracking of the disk-like recording medium mounted on the mounting portion are performed in the direction crossing the vertical direction, for example, in the direction substantially perpendicular to the vertical direction.

When a light beam for recording information or reading information is made incident on the recording surface portion of the disk-like recording medium mounted on the disk mounting portion with the recording surface portion substantially located within the vertical plane from the optical head portion including the objective lens disposed opposite to the recording surface portion through the objective lens, the tracking control portion allows the objective lens to be moved radially of the disk-like recording medium in the direction substantially perpendicular to the vertical direction, to thereby control a tracking state in which the light beam incident on the recording surface portion of the disk-like recording medium reaches a recording track in the recording surface portion. Also the optical head drive portion allows the optical head portion to be moved radially of the disk-like recording medium in the direction substantially perpendicular to the vertical direction.

Accordingly, the movement of the objective lens in the tracking direction within the vertical plane parallel to the vertical plane within which the recording surface portion of the disk-like recording medium mounted on the disk mounting portion is located in the state in which the cartridge is supported by the cartridge housing portion, is performed along the direction substantially perpendicular to the vertical direction. As a result, the objective lens is less susceptible to a stationary displacement due to the gravity thereof and a displacement due to a vertical vibration applied to the apparatus, and thereby it can be moved stably with less undesirable displacement. Further, the entire optical head portion including the objective lens is prevented from being affected by the vertical vibration applied to the apparatus, and is avoided from being undesirably moved.

BRIEF DESCRIPTION OF THE DRAWINGS

FIG. 11 is a block diagram showing essential portions of the embodiment of the information recording/reproducing device of the present invention;

FIG. 12 is a conceptual view illustrating a tracking control portion, a focus control portion, and a head drive unit in the embodiment of the information recording/reproducing device of the present invention;

DETAILED DESCRIPTION OF THE PREFERRED EMBODIMENTS

Figure 1:
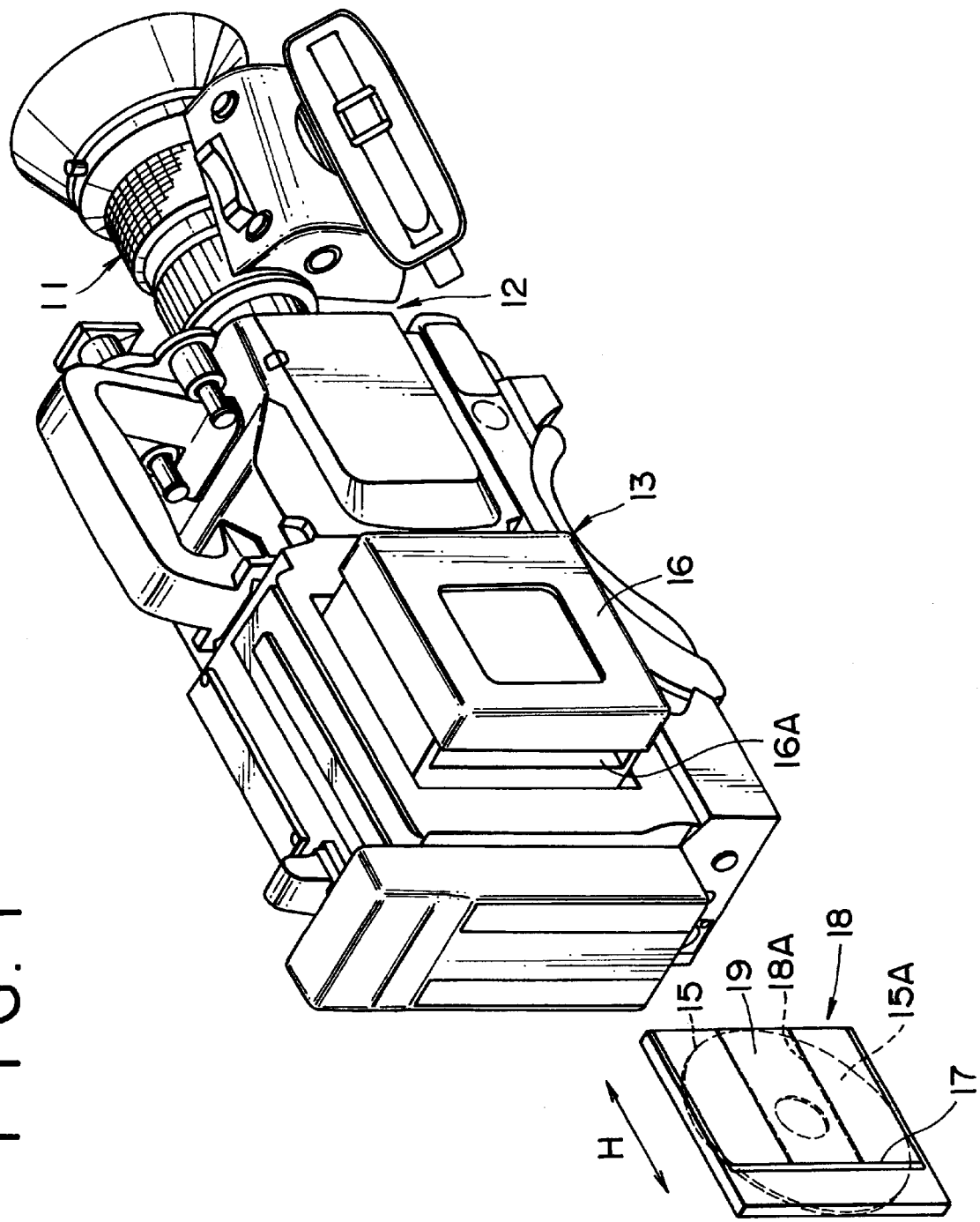
FIG. 1 is a perspective view showing a portable type video and audio recording/reproducing apparatus to which an embodiment of an information recording/reproducing device of the present invention is applied.

FIG. 1 shows a portable video and audio recording/reproducing apparatus to which an information recording/reproducing device according to the present invention is applied. The portable video and audio recording/reproducing apparatus is so configured that a video camera device 12 including an image pick-up lens system 11 is integrated with an information recording/reproducing device 13 as one example of the information recording/reproducing device of the present invention, together with a microphone device, an image monitor device, a speaker device, and the like.

The information recording/reproducing device 13 includes a cartridge housing portion 16 having a rear opening portion 16A provided in a rear wall portion thereof. A cartridge 18 containing a disk 15 as one example of a writable disk-like recording medium is inserted into the cartridge housing portion 16 through the rear opening portion 16A in the direction substantially perpendicular to the vertical direction, that is, in the horizontal direction (shown by an arrow H).

The cartridge 18 is formed into a flattened rectangular parallelopiped shape with a relatively small thickness. The disk 15, contained in the cartridge 18, has a base body on both surfaces of which recording surface portions 15A (only one recording surface portion 15A is shown in FIG. 1) are provided.

Figure 2:
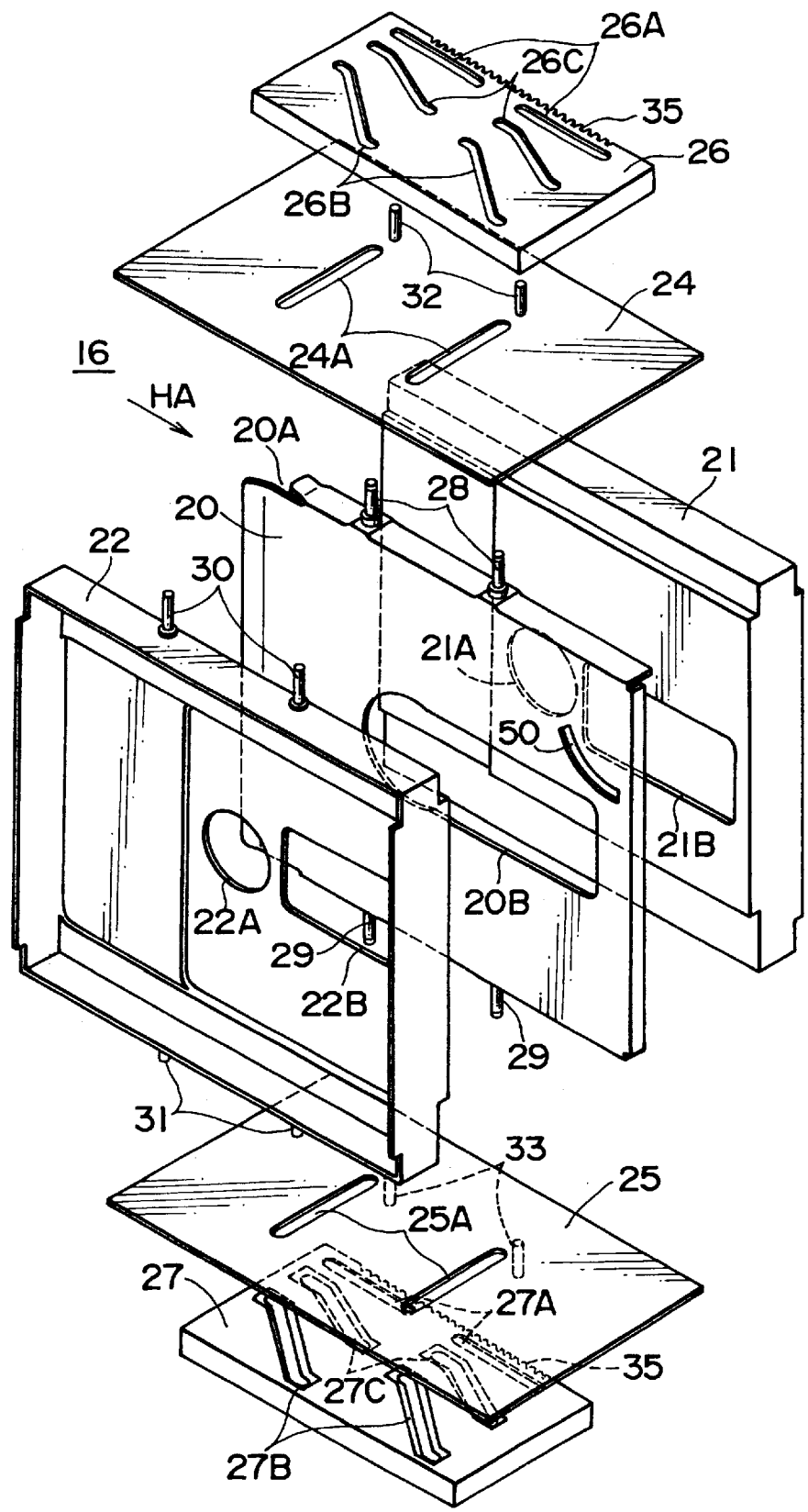
FIG. 2 is an exploded perspective view of a cartridge housing portion used for the embodiment of the information recording/reproducing device of the present invention.

As shown in FIG. 2, the cartridge housing portion 16 contains a cartridge holder 20, a fixed body 21 and a movable body 22 which are disposed opposite to each other with the cartridge holder 20 put therebetween, an upper plate 24 and a lower plate 25, and an upper slider 26 and a lower slider 27. The cartridge holer 20 has a rear opening portion 20A to be connected to the rear opening portion 16A of the cartridge housing portion 16, a pair of engaging pins 28 and a pair of engaging pins 29 which vertically extend from an upper wall portion and a lower wall portion of the cartridge holder 20, respectively, and an opening portion 20B formed in a side wall portion connecting the upper wall portion to the lower wall portion in such a manner as to extend from a central portion of the side wall portion in the direction (shown by an arrow HA) along which the cartridge 18 is inserted in the cartridge housing portion 16. The movable body 22 has a pair of engaging pins 30 and a pair of engaging pins 31 which vertically extend from an upper wall portion and a lower wall portion of the movable body 22, respectively, and a central hole 22A and a slot 22B (extending in the direction HA) which are provided in a side wall portion connecting the upper wall portion to the lower wall portion in such a manner as to be opposed to the opening portion 20B provided in the cartridge holder 20. The fixed body 21 has similarly a central hole 21A and an opening portion 21B (extending in the direction HA) which are provided in a side wall portion connecting an upper wall portion to a lower wall portion of the fixed body 21 in such a manner as to be opposed to the opening portion 20B provided in the cartridge holder 20.

The upper plate 24 is positioned over the cartridge holer 20, fixed body 21, and movable body 22, and it has a pair of slots 24A extending in the direction perpendicular to the direction HA and a pair of engaging pins 32 disposed in proximity to the slots 24A and extending in the vertical direction. The upper slider 26 is positioned over the upper plate 24, and it has a pair of slots 26A which extend in the direction HA and into which the engaging pins 32 provided on the upper plate 24 are to be engaged, a pair of cam holes 26B tiltingly extending in the direction HA, and a pair of cam holes 26C positioned between the slots 26A and the cam holes 26B and tiltingly extending in the direction HA.

The pair of engaging pins 30 provided on the movable body 22 pass through the pair of slots 24A provided in the upper plate 24 and are engaged into the pair of cam holes 26B provided in the upper slider 26. The pair of engaging pins 28 provided on the cartridge holder 20 pass through the pair of slots 24A provided in the upper plate 24 and are engaged into the pair of cam holes 26C provided in the upper slider 26.

The lower plate 25 is positioned under the cartridge holder 20, fixed body 21, and movable body 22, and it has a pair of slots 25A extending in the direction perpendicular to the direction HA, and a pair of engaging pins 33 disposed in proximity to the slots 25A and extending in the vertical direction. The lower slider 27 is positioned under the lower plate 25, and it has a pair of slots 27A which extend in the direction HA and into which the pair of engaging pins 33 provided on the lower plate 25 are to be engaged, a pair of cam holes 27B tiltingly extending in the direction HA, and a pair of cam holes 27C positioned between the pair of slots 27A and the pair of cam holes 27B and tiltingly extending in the direction HA.

The pair of engaging pins 31 provided on the movable body 22 pass through the pair of slots 25A provided in the lower plate 25 and are engaged into the pair of cam holes 27B provided in the lower slider 27. The pair of engaging pins 29 provided on the cartridge holder 20 pass through the pair of slots 25A provided in the lower plate 25 and are engaged into the pair of cam holes 27C provided in the lower slider 27.

Figure 3:
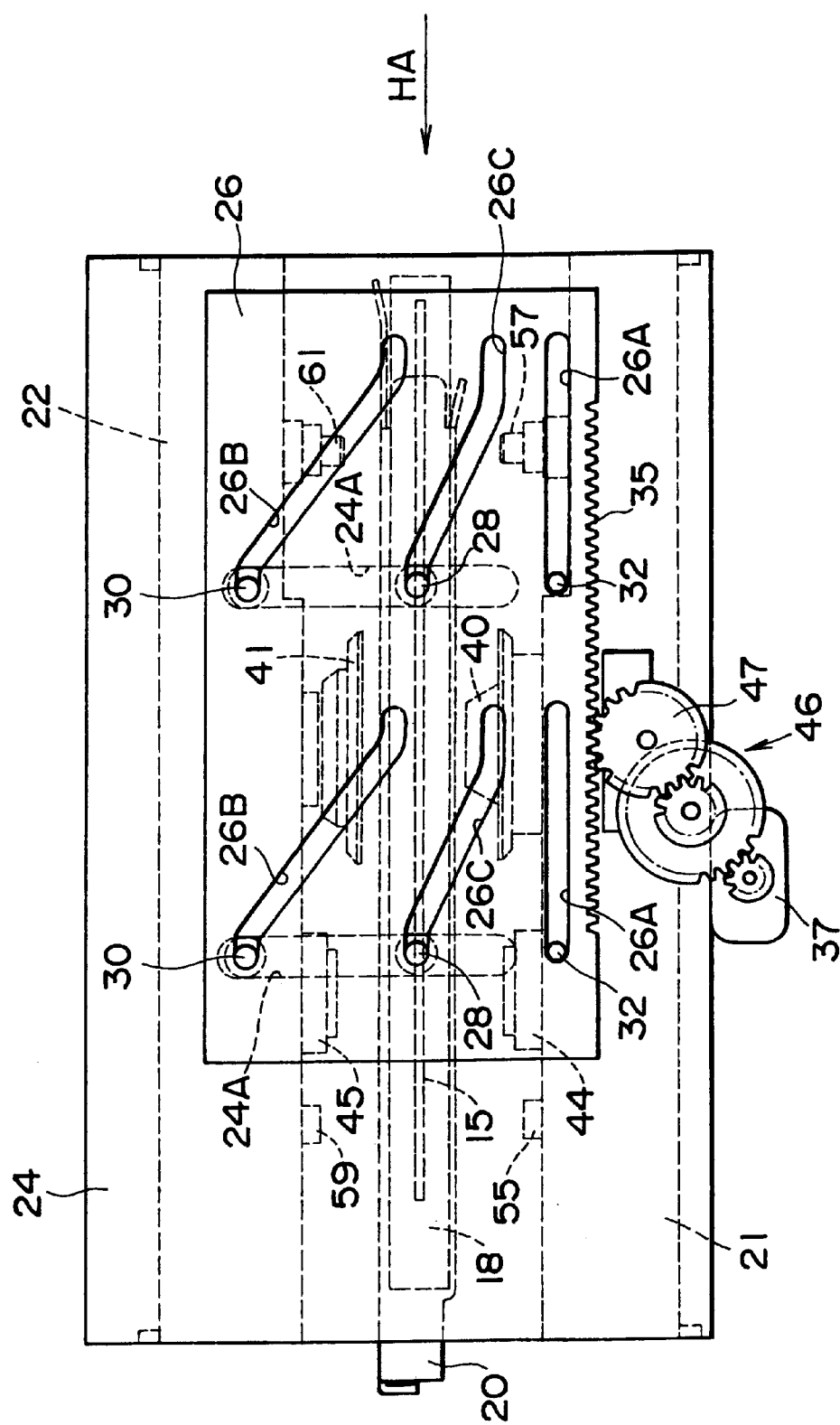
FIG. 3 is a plan view illustrating operation of the cartridge housing portion used for the embodiment of information recording/reproducing device of the present invention.

A rack portion 35 extending in the direction HA is provided at one end portion of each of the upper and lower sliders 26 and 27. As shown in FIG. 3, the cartridge housing portion 16 has a motor 37 used commonly to both the rack portions 35 provided on the upper and lower sliders 26 and 27, and also it has a disk mounting portion 40, a disk clamp portion 41, and optical recording/reading head portions 44 and 45.

A gear 47 forming a gear mechanism 46 for transmitting a drive force of the motor 37 is meshed with the rack portion 35 provided on the upper slider 26. A gear forming a gear mechanism for transmitting a drive force of the motor 37 is similarly meshed with the rack portion 35 of the lower slider 27. The disk mounting portion 40 is provided on the fixed body 21 in a state in which it projects from the central hole 21A provided in the fixed body 21 toward the opening portion 20B provided in the cartridge holder 20. The disk clamp portion 41, opposite to the disk mounting portion 40, is provided on the movable body 22 in a state in which it projects from the central hole 22A provided in the movable body 22 toward the opening portion 20B provided in the cartridge holder 20. The optical recording/reading head portion 44 is provided on the fixed body 21 in such a manner as to be located at the opening portion 21B provided in the fixed body 21. The optical recording/reading head portion 45 is provided on the movable body 22 in such a manner as to be located at the opening portion 22B provided in the movable body 22. The optical recording/reading head portion 45 is opposed to the optical recording/reading head portion 44 provided on the fixed body 21 through the opening portion 20B provided in the cartridge holder 20.

The upper slider 26 provided with the rack portion 35 is moved in the direction HA or the opposed direction thereof in accordance with the rotating direction of the motor 37 in a range in which the movement of the upper slider 26 is restricted by the pair of slots 26A into which the pair of engaging pins 32 provided on the upper plate 24 are engaged; and the lower slider 27 provided with the rack portion 35 is similarly moved in the direction HA or the opposed direction thereof in accordance with the rotating direction of the motor 37 in a range in which the movement of the lower slider 27 is restricted by the pair of slots 27A into which the pair of engaging pins 33 provided on the lower plate 25 are engaged. Along with the movement of the upper and lower sliders 26 and 27, the cartridge holder 20 is moved close to or apart from the fixed body 21 provided with the disk mounting portion 40 in a range in which the movement of the cartridge holder 20 is restricted by the pair of the slots 24A and the pair of slot 25A respectively provided in the upper and lower plates 24 and 25 and also the pair of cam holes 26C and the pair of cam holes 27C respectively provided in the upper and lower sliders 26 and 27; and the movable body 22 is similarly moved close to or apart from the fixed body 21 provided with the disk mounting portion 40 in a range in which the movement of the movable body 22 is restricted by the pair of slots 24A and the pair of slots 25A respectively provided in the upper and lower plates 24 and 25 and also the pair of cam holes 26B and the pair of cam holes 27B respectively provided in the upper and lower sliders 26 and 27.

Figure 4:
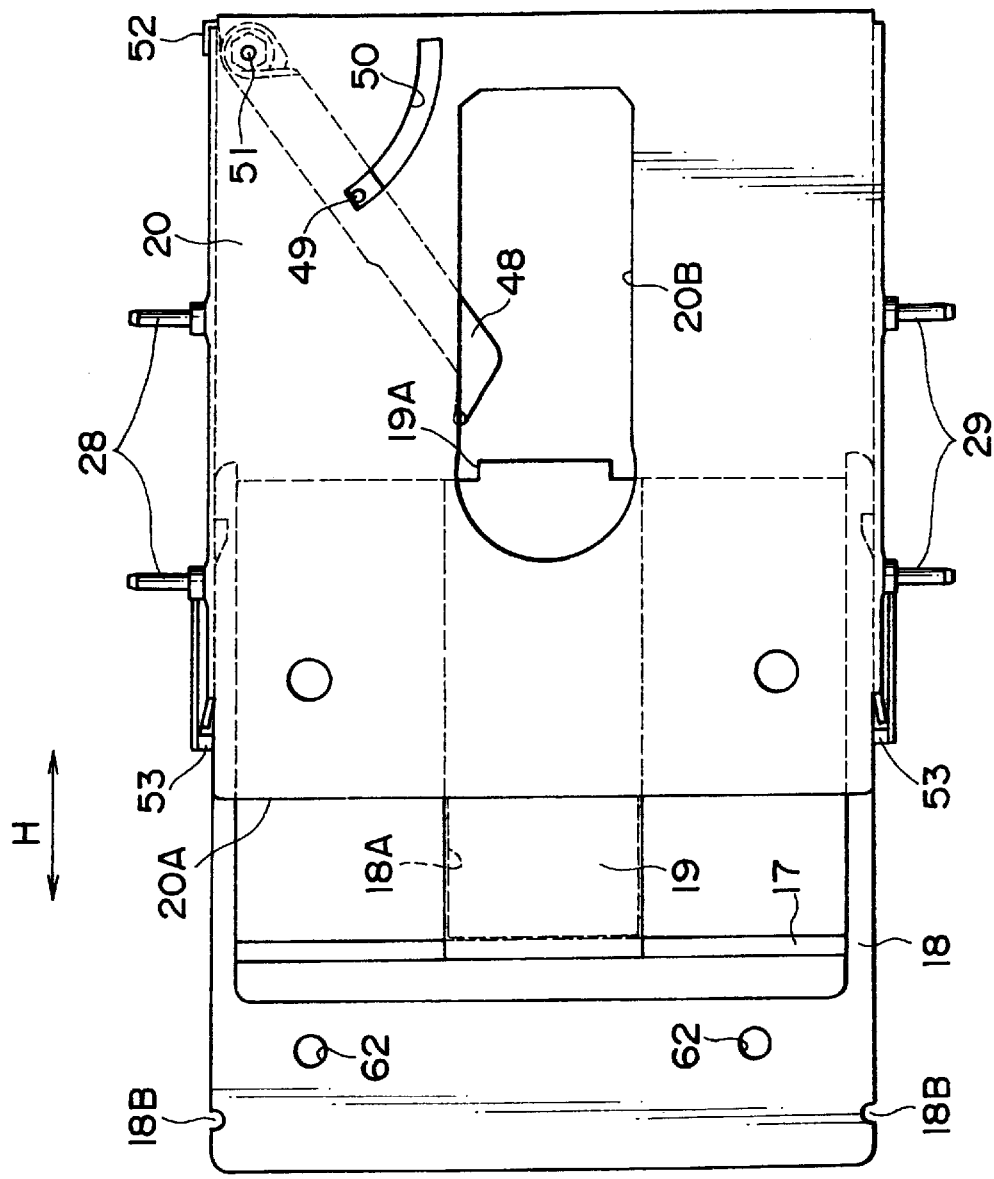
FIG. 4 is a plan view illustrating a cartridge and a cartridge holder used for the embodiment of the information recording/reproducing device of the present invention.

On the other hand, as shown in FIGS. 1 and 4, the cartridge 18 containing the disk 15 has a slider groove 17 and a movable lid member 19 movable along the slide groove 17. The movable lid member 19 provided on the cartridge 18 is bent in a U-shape in such a manner as to cover both surfaces of the body of the disk 15 contained in the cartridge 18. Both end portions of the U-shaped movable lid member 19 are engaged in the slider groove 17 provided in the cartridge 18. The movable lid member 19 has a stepped portion 19A positioned at the U-shaped bent portion, and is held at a position where it closes the opening portion 18A provided in the cartridge 18 by a biasing force of a spring member (not shown) provided on the cartridge 18.

On the cartridge holder 20 is mounted through a shaft 51 a movable arm member 48 for moving the movable lid member 19 of the cartridge 18 inserted through the rear opening portion 16A of the cartridge housing portion 16 in the horizontal direction (shown by the arrow H). The movable arm member 48 has at its intermediate portion a stopper pin 49 to be engaged into an arcuate slot 50 provided in the cartridge holder 20, and it is turnable around the shaft 51 in a range in which the movement of the movable arm member 48 is restricted by the slot 50 into which the arcuate stopper pin 49 is engaged. A toggle spring 52 is wound around the shaft 51. A leading end portion of the movable arm member 48 is biased by the toggle spring 52 in the direction in which it comes close to the rear opening portion 20A provided in the cartridge holder 20. The cartridge holder 20 has lock members 53, movable interlocking with link members (not shown), which are mounted on the upper wall portion provided with the pair of engaging pins 28 and on the lower wall portion provided with the pair of engaging pins 29.

The housing of the cartridge 18 containing the disk 15 in the cartridge housing portion 16 will be described below. In the cartridge housing portion 16, the cartridge holder 20 is separated at a relatively large distance from each of the fixed body 21 and the movable body 22. Also, the cartridge 18 is in a state in which the opening portion 18A thereof is closed by the movable lid member 19. The cartridge 18 in such a state is inserted, with the U-shaped bent portion of the movable lid member 19 at the head, in the horizontal direction (shown by the arrow H) into the cartridge holder 20 of the cartridge housing portion 16 through both the rear opening portion 16A of the cartridge housing portion 16 and the rear opening portion 20A of the cartridge holder 20 connected to the rear opening portion 16A. In such an inserted state, the opening portion 18A provided in the cartridge 18, the opening portion 20B provided in the cartridge holder 20, the opening portion 21B provided in the fixed body 21, and the opening portion 22B provided in the movable body 22 are positioned substantially at the same level. The insertion of the cartridge 18 into the cartridge holder 20 allows the leading end portion of the movable arm member 48 disposed on the cartridge holder 20 to be engaged with the stepped portion 19A of the movable lid member 19 provided on the cartridge 18.

Figure 5:
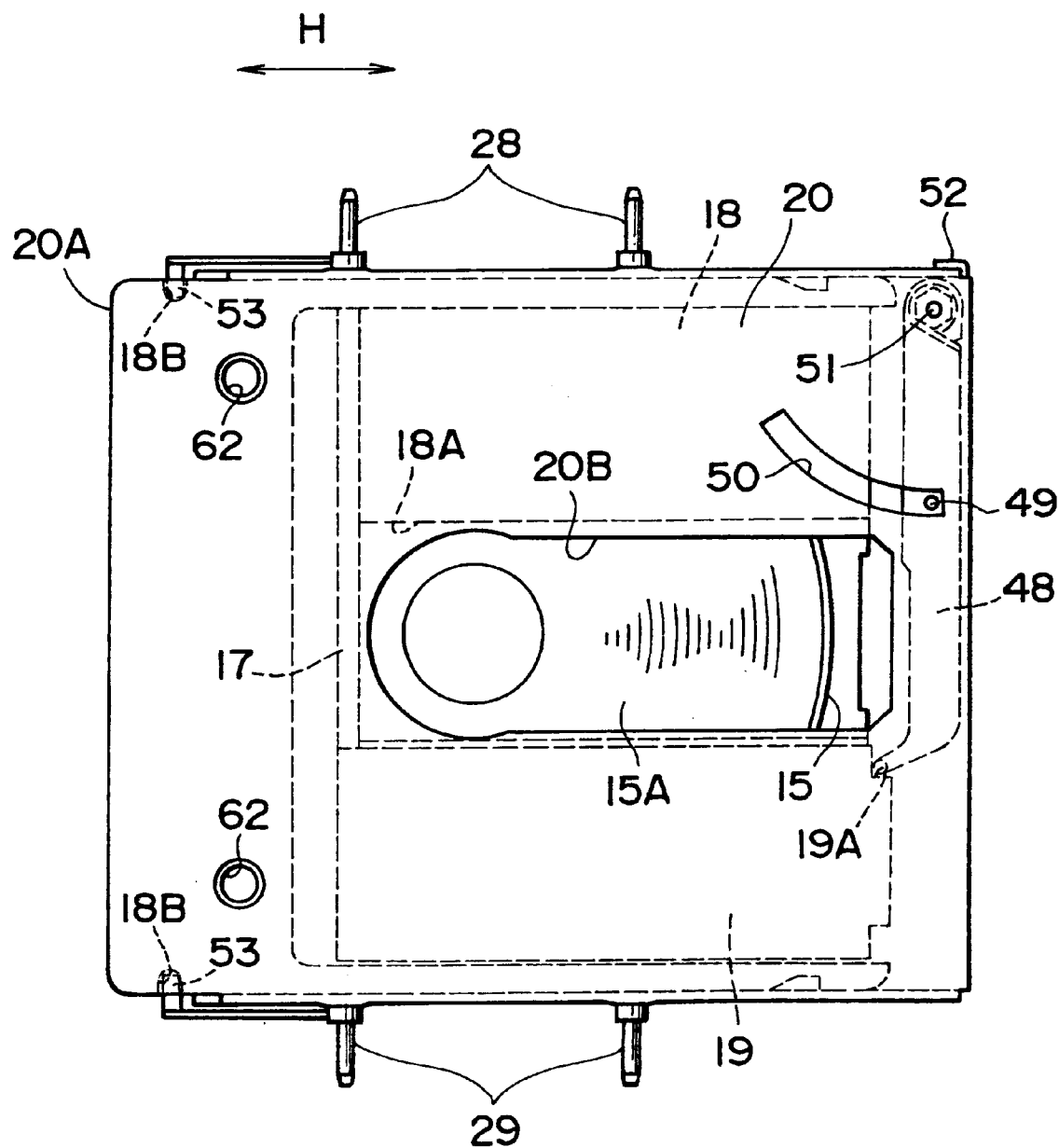
FIG. 5 is a plan view illustrating the cartridge and the cartridge holder used for the embodiment of the information recording/reproducing device of the present invention.

The movable arm member 48 with its leading end portion engaged with the stepped portion 19A of the movable lid member 19 is turned in the direction against the biasing force of the toggle spring 52 in accordance with the movement of the cartridge 18 inserted in the cartridge holder 20 along the horizontal direction (shown by the arrow H). The turning of the movable arm member 48 causes the movable lid member 19 to be gradually moved along the slider groove 17 against the biasing force of the spring member acting to the movable lid member 19. Consequently, as shown in FIG. 5, when the cartridge 18 is housed in the cartridge holder 20 by movement thereof along the horizontal direction (shown by the arrow H), the movable lid member 19 is moved by the movable arm member 48 to open the opening portion 18A provided in the cartridge 18, so that the recording surface portions 15A provided on both the surfaces of the body of the disk 15 contained in the cartridge 18 are located at a position where they are exposed to the exterior through the opening portion 18A provided in the cartridge 18. Further, when the cartridge 18 is housed in the cartridge holder 20, the pair of lock members 53 provided on the cartridge holder 20 are engaged in a pair of recessed portions 18B provided in the cartridge 18, to thereby position and support the cartridge 18 by the cartridge holder 20.

Figure 6:
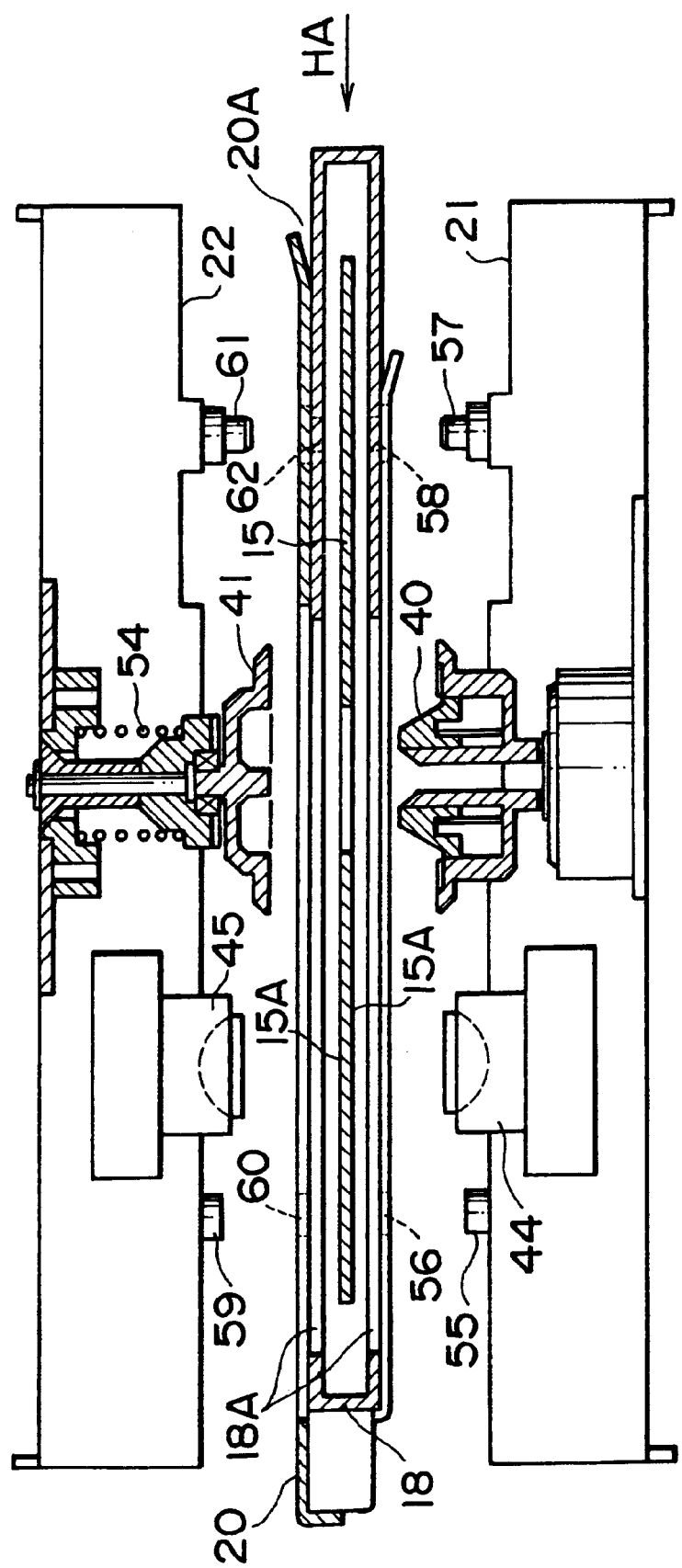
FIG. 6 is a sectional view illustrating a disk mounting portion for mounting a disk-like recording medium used for the embodiment of the information recording/reproducing device of the present invention.

In this way, the cartridge 18 is inserted in the cartridge holder 20 of the cartridge housing portion 16 along the direction substantially perpendicular to the vertical direction, that is, in the horizontal direction (shown by the arrow H). Accordingly, the disk 15 with the recording surface portions 15A facing the exterior through the opening portion 18A provided in the cartridge 18 is, as shown in FIGS. 3 and 6, positioned between on the fixed body 21 side provided with the disk mounting portion 40 and the optical recording/reading head portion 44 and on the movable body 22 side provided with the disk clamp portion 41 and the optical recording/reading head portion 45, with the recording surface portions 15A being substantially located with the vertical plane. And, by positioning and supporting the cartridge 18 by the pair of lock members 53 provided on the cartridge holder 20, the disk 15 is suitably located opposite to both the disk mounting portion 40 and the disk clamp portion 41 biased in the direction close to the disk mounting portion 40 by a coil spring 54 wound around the disk clamp portion 41.

Figure 7:
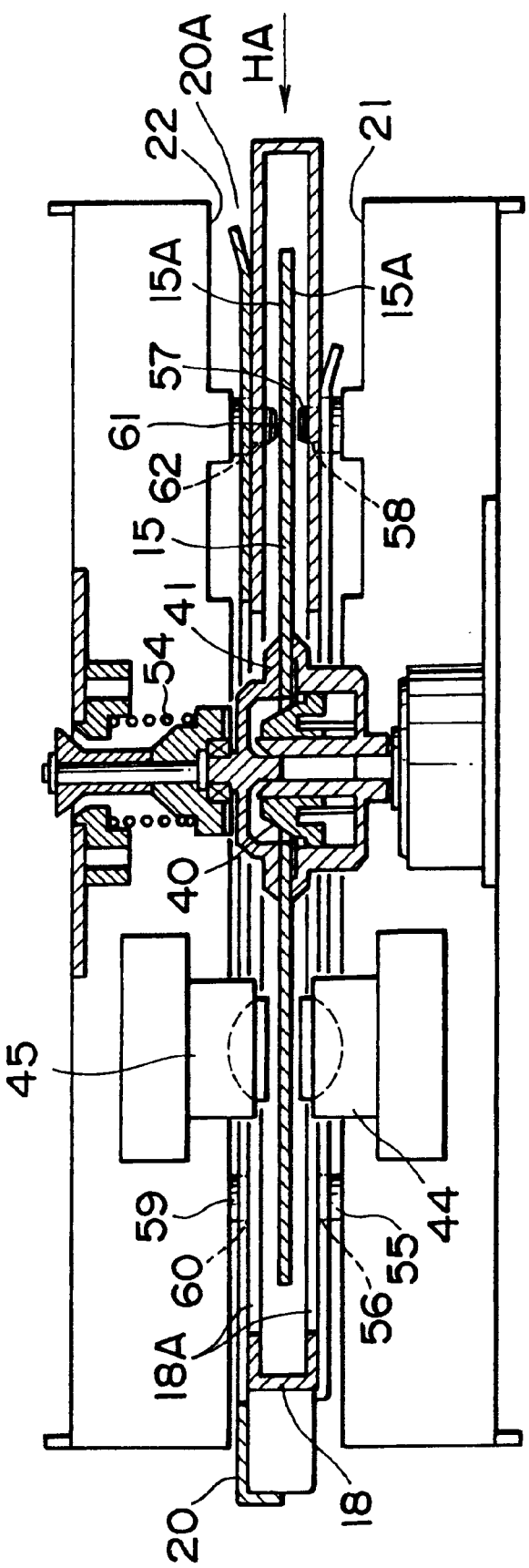
FIG. 7 is a sectional view illustrating the disk mounting portion for mounting a disk-like recording medium used for the embodiment of the information recording/reproducing device of the present invention.

In the state in which the cartridge 18 is housed in the cartridge holder 20, the motor 37 common to the rack portions 35 provided on the upper and lower sliders 26 and 27 is, for example, normally rotated for a specific period of time, so that the upper and lower sliders 26 and 27 are moved in the direction (shown by the arrow HA in FIG. 6) where the cartridge 18 is inserted in the cartridge holder 20. Along with the movement of the upper and lower sliders 26 and 27 in the direction HA, both the cartridge holder 20 housing the cartridge 18 and the movable body 22 are moved in the direction close to the fixed body 21. Thus, as shown in FIG. 7, the disk 15 contained in the cartridge 18 is pressed by the disk clamp portion 41 biased by the biasing force of the coil spring 54 with the recording surface portions 15A provided on both the surfaces of the body of the disk 15 being located substantially within the vertical plane, to be mounted on the disk mounting portion 40.

When the disk 15 is mounted on the disk mounting portion 40, a reference pin 55 provided on the fixed body 21 is engaged in a reference hole 56 provided in the cartridge holder 20 and also a reference pin 57 provided on the fixed body 21 is engaged into a reference hole 58 provided in the cartridge 18 via a through-hole provided in the cartridge holder 20. This allows accurate positioning of the disk 15 with respect to the disk mounting portion 40. On the other hand, a reference pin 59 provided on the movable body 22 is engaged in a reference hole 60 provided in the cartridge holder 20 and also a reference pin 61 provided on the movable body 22 is engaged in a reference hole 62 provided in the cartridge 18 via a through-hole provided in the cartridge holder 20. This allows accurate positioning of the disk 15 with respect to the disk clamp portion 41. Consequently, the disk 15 pressed by the disk clamp portion 41 is accurately, certainly mounted on the disk mounting portion 40.

When the disk mounting portion 40 is rotated by a disk drive motor contained in the information recording/reproducing device 13, the disk 15 mounted on the disk mounting portion 40 is rotated together with the disk mounting portion 40, with a central portion of the recording surface portion 15A being taken as a rotational center.

A phase-conversion recording is performed in each of the recording surface portions 15A provided on both the surfaces of the body of the disk 15, for example, by forming a recording layer in which a portion on which a laser beam having a recording high power is incident is turned into a crystalline state while a portion on which a laser beam having a recording low power is incident is turned into an amorphous state. When such phase-conversion recording is performed for the recording surface portion 15A of the disk 15 in the rotating state, crystalline portions and amorphous portions are sequentially formed in the recording layer on the basis of recording information, to thus form annular recording tracks.

Reading of information recorded in the recording layer is performed by making use of the fact that an optical reflectance of the amorphous portion formed in the recording layer is lower than the optical reflectance of the crystalline portion formed in the recording layer. To be more specific, when a reading laser beam having a specific intensity smaller than that of the recording laser beam is incident on the recording surface portion 15A of the disk 15 along the annular recording track formed in the recording layer provided in the recording surface portion 15A, the reading laser beam is reflected from the amorphous portion in the annular recording track with a relatively small intensity and also reflected from the crystalline portion in the annular recording track with a relatively large intensity. Thus, by detecting a change in intensity between the reflected laser beams, the information recorded in the recording layer is read, that is, reproduced.

Figure 8:
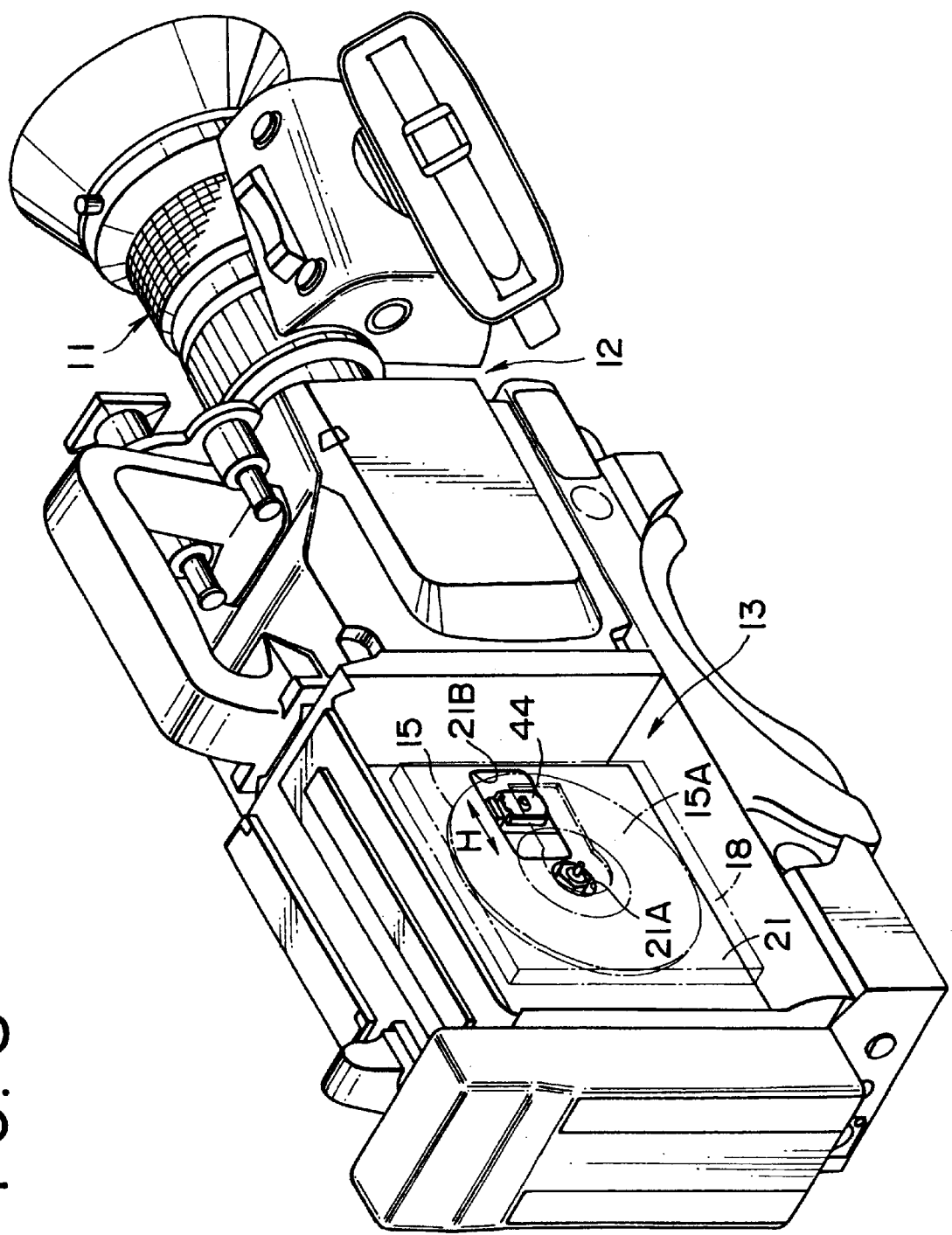
FIG. 8 is a perspective view illustrating a relationship between a disk-like recording medium and an optical head portion in the embodiment of the information recording/reproducing device of the present invention.

As shown in FIG. 8, the optical recording/reading head portion 44 provided on the fixed body 21 is allowed to be reciprocated in the radial direction of the disk 15 mounted on the disk mounting portion 40 in a range restricted by the opening portion 21B provided in the fixed body 21, while the optical recording/reading head portion 45 provided on the movable body 22 is also allowed to be reciprocated in the radial direction of the disk 15 mounted on the disk mounting portion 40 in a range restricted by the opening portion 22B provided in the movable body 22. The optical recording/reading head portions 44 and 45 are reciprocated in the direction substantially perpendicular to the vertical direction, that is, in the horizontal direction (shown by the arrow H) within a vertical plane parallel to the vertical plane in which the recording surface potions 15A of the disk 15 mounted on the disk mounting portion 40 are located.

Figure 9:
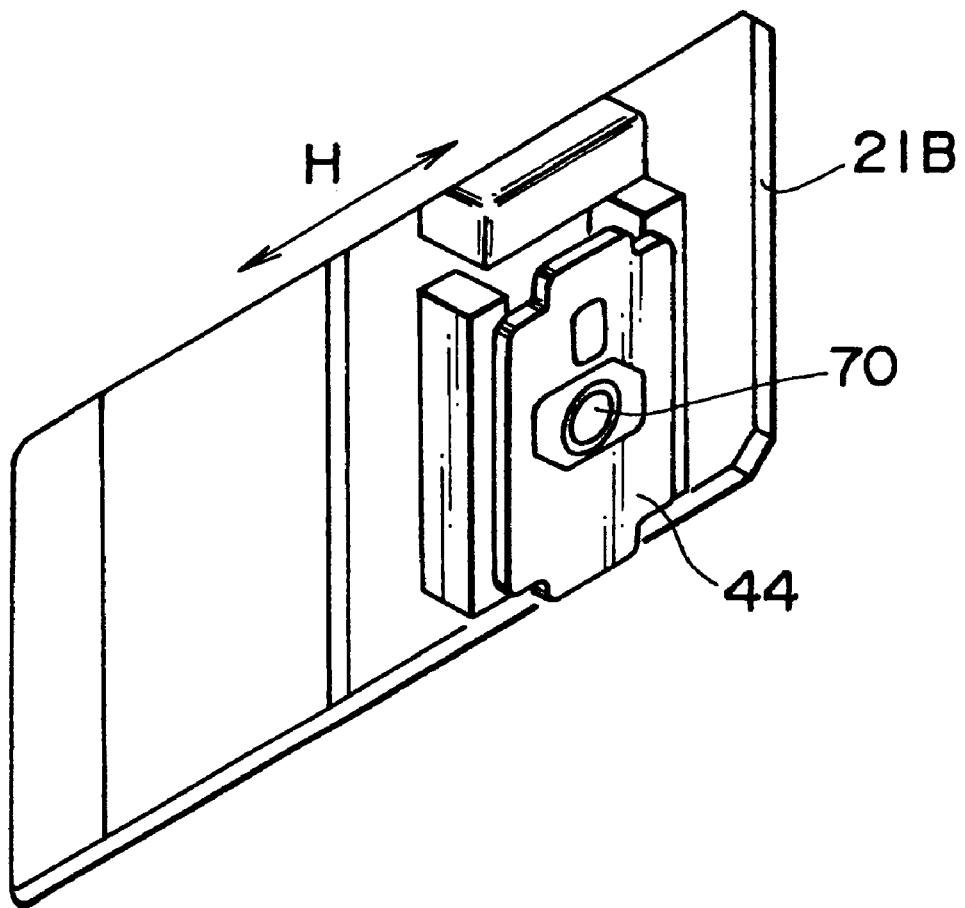
FIG. 9 is a partial perspective view illustrating the optical head portion used for the embodiment of the information recording/reproducing device of the present invention.

As shown on a large scale in FIG. 9, the optical recording/reading head portion 44, disposed in the opening portion 21B provided in the fixed body 21 and reciprocated in the horizontal direction (shown by the arrow H) in the range restricted by the opening portion 21B, has an objective lens 70 opposite to one recording surface portion 15A of the disk 15 mounted on the disk mounting portion 40. A recording or reading laser beam generated in the optical head portion 44 is incident, through the objective lens 70, on one recording surface portion 15A of the disk 15 mounted on the disk mounting portion 40.

The optical recording/reading head portion 45, disposed in the opening portion 22B of the movable body 22 and reciprocated in the horizontal direction (shown by the arrow H) in the range restricted by the opening portion 22B, has similarly an objective lens opposite to the other recording surface portion 15A of the disk 15 mounted on the disk mounting portion 40. A recording or reading laser beam generated in the optical head portion 45 is incident, through the objective lens, on the other recording surface portion 15A of the disk 15 mounted on the disk mounting portion 40.

Figure 10:
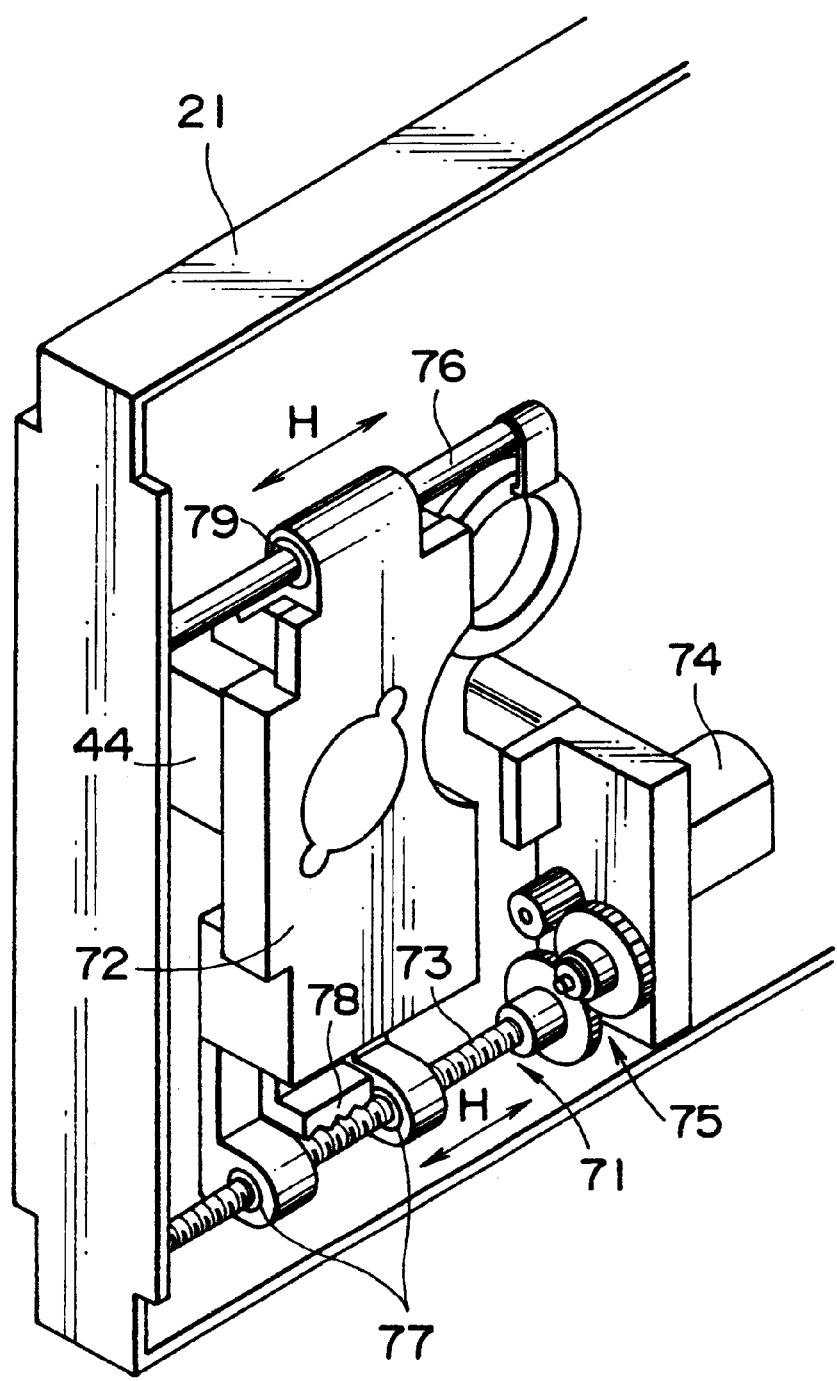
FIG. 10 is a partial perspective view illustrating an optical head drive mechanism used for the embodiment of the information recording/reproducing device of the present invention.

FIG. 10 shows the optical recording/reading head portion 44 and one example of an optical head drive mechanism 71 for reciprocating the optical head portion 44 in the horizontal direction (shown by the arrow H). The optical head drive mechanism 71 includes a supporting base plate member 72 for supporting the optical head portion 44; a feed screw shaft 73 for reciprocating the supporting base plate member 72 in the horizontal direction (shown by the arrow H); a head feed motor 74 for turning the feed screw shaft 73; a reduction gear portion 75 for reducing the rotation of the head feed motor 74 and transmitting the reduced rotation to the feed screw shaft 73; and a guide member 76 for guiding the supporting base plate member 72 upon horizontal reciprocation of the supporting base plate member 72. The entire optical head drive mechanism 71 is mounted on the fixed body 21 on the back surface side opposed to the surface facing the disk 15 mounted on the disk mounting portion 40.

Sliding sleeve portions 77 and a rack portion 78 are provided on a lower portion of the supporting base plate member 72. The sliding sleeve portions 77 are fitted around the feed screw shaft 73, and the rack portion 78 is engaged with the feed screw shaft 73. A sliding sleeve portion 79 is provided on an upper portion of the supporting base plate member 72 in such a manner as to be fitted around the guide member 76. The feed screw shaft 73 and the guide member 76 are disposed in parallel to each other, and extend in the horizontal direction (shown by the arrow H) along the recording surface portion 15A of the disk 15 mounted on the disk mounting portion 40.

The rotation of the head feed motor 74 is reduced by the reduction gear portion 75 and is then transmitted to the feed screw shaft 73. This causes the feed screw shaft 73 to be rotated in the direction corresponding to the rotational direction of the head feed motor 74. Thus the rack portion 78 provided on the supporting base plate member 72 engaged with the feed screw shaft 73 is moved along the feed screw shaft 73 by rotation of the feed screw shaft 73. The supporting base plate member 72 is thus moved in the direction along the feed screw shaft 73, that is, in the horizontal direction with the sliding sleeve portions 77 slid with respect to the feed screw shaft 73 and with the sliding sleeve portion 79 slid with respect to the guide member 76. As a result, the optical recording/reading head portion 44 supported by the supporting base plate member 72 is reciprocated in the direction substantially perpendicular to the vertical direction, that is, in the horizontal direction (shown by the arrow H) within the vertical plane parallel to the vertical plane in which the recording surface portion 15A of the disk 15 mounted on the disk mounting portion 40 is located.

An optical head drive mechanism for reciprocating the optical recording/reading head portion 45 in the horizontal direction (shown by the arrow H) has the same configuration as that of the optical head drive mechanism 71 for reciprocating the optical recording/reading head portion 44 in the horizontal direction.

The optical recording/reading head portion 44 is restricted in its position by the rack portion 78 and the feed screw shaft 73 when the optical head drive mechanism 71 is in a non-operation state and the feed screw shaft 73 is not rotated. This is because the rack portion 78 is provided on the supporting base plate member 72 for supporting the optical head portion 44 and is engaged with the feed screw shaft 73. The optical recording/reading head portion 45 is similarly restricted in its position by the rack portion and the feed screw shaft of the optical head drive mechanism when the optical head drive mechanism is in the non-operation state and the feed screw shaft is not rotated.

FIG. 11 shows an essential portion of the information recording/reproducing device 13 which is one example of the information recording/reproducing device of the present invention. In this example, the writable disk 15 is mounted in the disk mounting portion 40 in a state in which the recording surface portions 15A provided on both the surfaces of the body are located substantially within the vertical plane, and when the disk mounting portion 40 is rotated at a specific number of rotation by a disk drive motor 80, the disk 15 is rotated at the specific number of rotation together with the disk mounting portion 40.

On both the sides of the disk 15 mounted on the disk mounting portion 40 and rotated together therewith, are disposed the optical recording/reading head portion 44 having the objective lens 70 matched with one recording surface portion 15A and the optical recording/reading head portion 45 having the objective lens 90 matched with the other recording surface portion 15A. The optical recording/reading head portions 44 and 45 are reciprocated substantially in the horizontal direction (shown by the arrow H) along the radial direction of the disk 15 within the vertical plane parallel to the vertical plane in which the recording surface portions 15A of the disk 15 are located. The horizontal reciprocation of the optical head portion 44 is performed by the optical head drive mechanism 71 including the feed screw shaft 73 extending in the horizontal direction along the recording surface portion 15A of the disk 15. Besides, the horizontal reciprocation of the optical recording/reproducing head portion 45 is performed by the optical head drive mechanism 91 including the feed screw shaft 93 extending in the horizontal direction along the recording surface portion 15A of the disk 15.

The optical recording/reading head portion 44 selectively records information in one recording surface portion 15A of the disk 15, and it also reads information recorded in one recording surface portion 15A of the disk 15 and feeds the read output signal. For this purpose, the optical head portion 44 includes an optical system including a laser light source 83 and the objective lens 70 for making incident a recording laser beam or a reading laser beam on one recording surface portion 15A of the disk 15 and for detecting a reflection laser beam, that is, a recording laser beam or a reading laser beam reflected from one recording surface portion 15A of the disk 15.

The optical recording/reading head portion 45 selectively records information in the other recording surface portion 15A of the disk 15, and it also reads information recorded in the other recording surface portion 15A of the disk 15 and feeds the read output signal. For this purpose, the optical head portion 45 includes an optical system including a laser light source 94 and the objective lens 90 for making incident a recording laser beam or a reading laser beam on the other recording surface portion 15A of the disk 15 and for detecting a reflection laser beam, that is, a recording laser beam or a reading laser beam reflected from the other recording surface portion 15A of the disk 15.

As shown in FIG. 12, the objective lens 70 contained in the optical head portion 44 has a tracking coil 85 forming a tracking control unit and a focus coil 86 forming a focus control unit. When being supplied with a tracking control drive signal which will be described later, the tracking coil 85 allows the objective lens 70 to be finely moved in the direction substantially parallel to the movement direction of the optical head portion 44 along the radial direction of the disk 15, that is, in the horizontal direction (shown by the arrow H) substantially perpendicular to the vertical direction. The fine movement of the objective lens 70 causes a spot formed on one recording surface portion 15A of the disk by a recording laser beam or a reading laser beam incident thereon through the objective lens 70 to be finely displaced in the direction where the spot passes through a portion of one recording surface portion 15A at which annular recording tracks are to be formed or through the annular recording tracks already formed in one recording surface portion 15A, that is, in the tracking direction. The tracking coil 85 thus controls the tracking state in which the recording laser beam incident through the objective lens 70 on one recording surface portion 15A of the disk 15 reaches a portion where annular recording tracks are to be formed in one recording surface portion 15A of the disk 15, or the tracking state in which the reading laser beam incident through the objective lens 70 on one recording surface portion 15A of the disk 15 reaches the annular recording tracks already formed in one recording surface portion 15A of the disk 15.

When being supplied with a focus control signal which will be described later, the focus coil 86 allows the objective lens 70 to be finely moved in such a manner as to be close to or apart from one recording surface portion 15A of the disk 15. This finely changes a degree of focus of a recording laser beam or a reading laser beam incident through the objective lens 70 on one recording surface portion 15A of the disk 15. The focus coil 86 thus controls the focus state of the recording laser beam or reading laser beam incident through the objective lens 70 on one recording surface portion 15A of the disk 15.

Like the objective lens 70 contained in the optical head portion 44, an objective lens 90 contained in the optical recording/reading head portion 45 has a tracking coil forming a tracking control portion and a focus coil forming a focus control portion. When being supplied with a tracking control drive signal, the tracking coil provided around the objective coil 90 allows the objective lens 90 to be finely moved in the direction substantially parallel to the movement direction of the optical head portion 45 along the radial direction of the disk 15, that is, in the horizontal direction (shown by the arrow H) substantially perpendicular to the vertical direction. The fine movement of the objective lens 90 causes a spot formed on the other recording surface portion 15A of the disk 15 by a recording laser beam or a reading laser beam incident thereon through the objective lens 90 to be finely displaced in the tracking direction. The tracking coil provided around the objective lens 90 thus controls the tracking state in which the recording laser beam incident through the objective lens 90 on the other recording surface portion 15A of the disk 15 reaches a portion where annular recording tracks are to be formed in the other recording surface portion 15A of the disk 15, or the tracking state in which the reading laser beam incident through the objective lens 90 on the other recording surface portion 15A of the disk 15 reaches the annular recording tracks already formed in the other recording surface portion 15A of the disk 15.

When being supplied with a focus control signal, the focus coil provided around the objective lens 90 allows the objective lens 90 to be finely moved in such a manner as to be close to or apart from the other recording surface portion 15A of the disk 15. This finely changes a degree of focus of a recording laser beam or a reading laser beam incident through the objective lens 90 on the other recording surface portion 15A of the disk 15. The focus coil provided around the objective lens 90 thus controls the focus state of the recording laser beam or reading laser beam incident through the objective lens 90 on the other recording surface portion 15A of the disk 15.

When information recording by the optical recording/reading head portion 44 is performed in such a state, an operation control unit 95 supplies a motor control signal XM to a servo-control signal forming unit 96 for the disk drive motor 80; a head control signal XHA to a serve-control signal forming unit 97 for the optical head portion 44; a recording laser power control command signal XPA to a power control signal forming unit 98 for the optical head portion 44; and a recording control signal XR to a recording signal forming unit 99. Also, data information DR to be recorded on one recording surface portion 15A of the disk 15 is supplied to an encoder unit 101 through a recording signal input terminal 100.

The encoder unit 101 encodes the data information DR in accordance with a specific encoding mode, to form recording data DRC expressing the encoded data information DR. The recording data DRC thus obtained by the encoder unit 101 is supplied to the recording signal forming unit 99.

At this time, the recording signal forming unit 99 is in an operational state depending on the recording control signal XR supplied from the operation control unit 95. The recording signal forming unit 99 thus forms a recording information signal CSR on the basis of the recording data DRC supplied from the encoder unit 101 and supplies it to the laser light source 83 contained in the optical system in the optical head portion 44.

The power control signal forming unit 98 receives the recording laser power control command signal XPA from the operation control unit 95 and forms, on the basis of the recording laser power control command signal XPA, a power control signal CPA allowing the laser light source 83 contained in the optical system in the optical head portion 44 to generate laser light for forming a recording laser beam. The power control signal CPA thus obtained from the power control signal forming unit 98 is supplied to the laser light source 83 in the optical head portion 44.

The laser light source 83 in the optical head portion 44 generates laser light which has a relatively large power based on the power control signal CPA and which is modified in its intensity based on the recording information signal CSR. The optical system contained in the optical head portion 44 forms a recording laser beam on the basis of the laser light generated by the laser light source 83. The recording laser beam based on the recording information signal CSR is made incident on one recording surface portion 15A of the disk 15 through the objective lens 70 contained in the optical system in the optical head portion 44.

In this case, the servo-control signal forming unit 96, to which the motor control signal XM is supplied from the operation control unit 95, forms a motor drive signal CM on the basis of the motor control signal XM and supplies it to the disk drive motor 80 through a motor drive unit 102. The disk drive motor 80 is rotated on the basis of the motor drive signal CM, to rotate the disk mounting portion 40 mounting the disk 15 at a specific rotational speed. As a result, the disk 15 mounted on the disk mounting portion 40 is rotated at the specific rotational speed with the central portion of the recording surface portion 15A taken as a rotational center.

When the disk drive motor 80 is rotated, a rotation detecting means represented by a frequency oscillator provided on the disk drive motor 80 generates a detection output signal SG regarding the rotational state of the disk drive motor 80, and supplies it to the servo-control signal forming unit 96. The motor drive signal CM supplied from the servo-control signal forming unit 96 is adjusted on the basis of the detection output signal SG supplied from the disk drive motor 80, to thereby perform a servo-control of the disk drive motor 80.

At this time, the servo-control signal forming unit 97, to which the head control signal XHA is supplied from the operation control unit 95, forms a head drive signal CHA on the basis of the head control signal XHA, and supplies it to the optical head drive mechanism 71 through a head drive unit 103. The head drive unit 103 and the optical head drive mechanism 71 form an optical head drive unit as a whole.

As shown in FIG. 12, the head drive signal CHA is supplied from the head drive unit 103 to the head feed motor 74 of the optical head drive mechanism 71. The head feed motor 74 is rotated on the basis of the head drive signal CHA. The rotation of the head feed motor 74 is transmitted to the feed screw shaft 73 through the reduction gear portion 75, to rotate the feed screw shaft 73 in the direction corresponding to the rotational direction of the head feed motor 74. As a result, the optical head portion 44 is moved in the horizontal direction along the feed screw shaft 73 on the basis of rotation of the feed screw shaft 73, to thus set the position of the optical head portion 44 with respect to one recording surface portion 15A of the disk 15.

In this way, the disk 15 mounted on the disk mounting portion 40 is rotated and the optical head portion 44 is located at the position corresponding to that of one recording surface portion 15A of the disk 15, and in such a state, the recording laser beam based on the recording information signal CSR supplied from the optical head portion 44 is made incident on one recording surface portion 15A of the disk 15 through the objective lens 70, so that the data information DR supplied through the recording signal input terminal 100 is recorded from a setting position in one recording surface portion 15A of the disk 15.

In such information recording, the recording laser beam incident on one recording surface portion 15A of the disk 15 is reflected therefrom, and the laser beam thus reflected is returned from one recording surface portion 15A of the disk 15 to the optical head portion 44 and is detected by an optical detecting portion contained in the optical system in the optical head portion 44. The optical head portion 44 generates a read output signal group QA on the basis of the detection output regarding the reflected laser beam, and supplies it to a read signal processing unit 104.

The read signal processing unit 104 forms, on the basis of the read output signal group QA, a tracking error signal STA and a focus error signal SFA regarding the recording laser beam incident on one recording surface portion 15A of the disk 15. The tracking error signal STA indicates a deviation in incident position of the recording laser beam with respect to a portion of one recording surface portion 15A where an annular recording track is to be formed. Besides, the focus error signal SFA indicates a degree of defocus as compared with a suitable focus state of the recording laser beam on one recording surface portion 15A. The tracking error signal STA and the focus error signal SFA obtained from the read signal processing unit 104 are supplied to the servo-control signal forming unit 97.

The servo-control signal forming unit 97 forms a tracking control drive signal CTA based on the tracking error signal STA, a focus control drive signal CFA based on the focus error signal SFA, and a head drive signal CHA based on a low frequency range component of the tracking error signal STA.

The head drive signal CHA based on the low frequency range component of the tracking error signal STA is supplied through the head drive unit 103 to the optical head drive mechanism 71 forming the optical head drive unit in co-operation with the head drive unit 103. In the optical head drive mechanism 71, the head drive signal CHA based on the low frequency range component of the tracking error signal STA from the head drive unit 103 is supplied to the head feed motor 74, to rotate the head feed motor 74 on the basis of the head drive signal CHA. This causes the optical head portion 44 to be moved in the horizontal direction along the feed screw shaft 73 rotated in accordance with rotation of the head feed motor 74 and to be continuously displaced in the radial direction of the disk 15 along with rotation of the disk 15 in the range restricted by the opening portion 21B provided in the above-described fixed body 21. To move the optical head portion 44 up to a specific position, the head drive signal CHA is formed on the basis of the head control signal XHA supplied from the operation control unit 95.

The tracking control drive signal CTA is supplied through a tracking control drive unit 105 to the tracking coil 85 additionally provided on the objective lens 70 of the optical head portion 44 as shown in FIG. 12. The tracking coil 85 allows the objective lens 70 to be finely moved, on the basis of the tracking control drive signal CTA, in the direction substantially parallel to the movement direction of the optical head portion 44 along the radial direction of the disk 15, that is, in the horizontal direction (shown by the arrow H) substantially perpendicular to the vertical direction.

The fine movement of the objective lens 70 allows a spot formed on one recording surface portion 15A of the disk 15 by the recording laser beam being made incident thereon through the objective lens 70 from the optical head portion 44 to be finely displaced in the tracking direction. This controls a tracking state in which the recording laser beam incident through the objective lens 70 on one recording surface portion 15A of the disk 15 reaches an annular recording track in one recording surface portion 15A of the disk 15.

The focus control drive signal CFA is supplied through the focus control drive unit 106 to the focus coil 86 additionally provided on the objective lens 70 of the optical head portion 44 as shown in FIG. 12. The focus coil 86 allows the objective lens 70 to be finely moved close to or apart from one recording surface portion 15A of the disk 15 on the basis of the focus control drive signal CFA.

The fine movement of the objective lens 70 finely changes a degree of focus of the recording laser beam incident on one recording surface portion 15A of the disk 15 through the objective lens 70, and thus controls a focus state of the recording laser beam incident through the objective lens 70 on one recording surface portion 15A of the disk 15.

When information is read by the optical recording/reading head portion 44, the operation control unit 95 supplies the motor control signal XM to the servo-control signal forming unit 96 for the disk drive motor 80, the head control signal XHA to the servo-control signal forming unit 97 for the optical head portion 44, and the reading laser power control command signal XPA to the power signal forming unit 98 for the optical head portion 44. Also a data selective control signal XS is supplied to an output data selecting unit 107.

The power control signal forming unit 98 receives the reading laser power command signal XPA from the operation control unit 95 and forms, on the basis of the reading laser power control command signal XPA, the power control signal CPA allowing the laser light source 83 contained in the optical system in the optical head portion 44 to generate laser light for forming a reading laser beam. The power control signal CPA thus obtained from the power control signal forming unit 98 is supplied to the laser light source 83 in the optical head 44. In addition, when information is read by the optical recording/reading head portion 44, the recording information signal CSR from the recording signal forming unit 99 is not supplied to the laser light source 83 in the optical head portion 44.

The laser light source 83 of the optical head portion 44 generates laser light of a specific intensity having a relatively small power based on the power control signal CPA, and the optical system contained in the optical head portion 44 forms a reading laser beam based on the laser light generated by the optical head portion 44. The reading laser beam is made incident on one recording surface portion 15A of the disk 15 through the objective lens 70 contained in the optical system in the optical head portion 44.

Like the above-described information recording by the optical recording/reading head portion 44, the disk 15 mounted on the disk mounting portion 40 is rotated at a specific rotational speed on the basis of the motor control signal XM supplied from the operation control unit 95; a servo-control for the disk drive motor 80 is performed; and the optical head portion 44 is positioned with respect to one recording surface portion 15A of the disk 15 on the basis of the head control signal XHA supplied from the operation control unit 95.

In this way, the disk 15 mounted on the disk mounting portion 40 is rotated and the optical head portion 44 is positioned with respect to one recording surface portion 15A of the disk 15, and in such a state, a reading laser beam of a specific intensity having a relatively small power is made incident from the optical head portion 44 on one recording surface portion 15A of the disk 15 through the objective lens 70, so that information recorded in the form of the annular recording tracks is read from a setting position in one recording surface portion 15A of the disk 15.

Upon such information reading, the reading laser beam incident on one recording surface portion 15A of the disk 15 is reflected therefrom and is returned from one recording surface portion 15A of the disk 15 to the optical head portion 44, to be thus detected by an optical detecting portion contained in the optical system in the optical head portion 44. The optical head portion 44 generates a read output signal group QA on the basis of the detection output regarding the reflected laser beam, and supplies it to the read signal processing unit 104.

The read signal processing unit 104 forms, on the basis of the read output signal group QA, a tracking error signal STA and a focus error signal SFA regarding the reading laser beam incident on one recording surface portion 15A of the disk 15. The tracking error signal STA indicates a deviation in incident position of the reading laser beam with respect to the annular recording track formed in one recording surface portion 15A. The focus error signal SFA indicates a degree of defocus as compared with a suitable focus state of the reading laser beam on one recording surface portion 15A. The read signal processing unit 104 also forms a read information signal SIA indicating information read from the annular recording track formed on one recording surface portion 15A of the disk 15.

Both the tracking error signal STA and the focus error signal SFA thus obtained from the read signal processing unit 104 are supplied to the servo-signal forming unit 97. Like information recording by the optical recording/reading head portion 44, the optical head portion 44 is moved, on the basis of both the tracking error signal STA and the focus error signal SFA, in the horizontal direction along the feed screw shaft 73 rotated in accordance with rotation of the head feed motor 74, and is continuously displaced in the radial direction of the disk 15 along with rotation of the disk 15 in a range restricted by the opening portion 21B provided in the above-described fixed body 21. The objective lens 70 is also finely moved in the direction substantially parallel to the movement direction of the optical head portion 44 along the radial direction of the disk 15, that is, in the horizontal direction (shown by the arrow H) substantially perpendicular to the vertical direction. This controls a tracking state in which the reading laser beam incident through the objective lens 70 on one recording surface portion 15A of the disk 15 reaches the annular recording track in one recording surface portion 15A of the disk 15. The objective lens 70 is also finely moved close to or apart from one recording surface portion 15A of the disk 15, to thus control a focus state of the reading laser beam incident through the objective lens 70 on one recording surface portion 15A of the disk 15.

The read information signal SIA obtained by the read signal processing portion 104 is amplified and waveform-equalized by an amplifying unit 108 and then supplied to a data discriminating unit 109 and a clock reproducing unit 110. The clock reproducing unit 110 reproduces a clock signal CKA on the basis of a data clock in the read information signal SIA, and supplies it to the data discriminating unit 109.

The data discriminating unit 109 discriminates data of the read information signal SIA on the basis of the clock signal CKA, to generate a digital information data DIA based on the read information signal SIA. The digital information data DIA generated at the data discriminating unit 109 is supplied to a decoder unit 111. At the decoder unit 111, the digital information data DIA is decoded to generate a reproduced information data DA and a reproduced address data DADA on the basis of the digital information data DIA.

The reproduced address data DADA obtained by the decoder unit 111 is supplied to an address data processing unit 112. The address data processing unit 112 forms an address output data DDA on the basis of the reproduced address data DADA, and supplies it to the operation control unit 95. The address output data DDA is used for control of a position of the optical head portion 44 with respect to one recording surface portion 15A of the disk 15.

The reproduced information data DA obtained by the decoder unit 111 is supplied to an information data processing unit 113. The information data processing unit 113 forms an information output data DOA on the basis of the reproduced information data DA, and supplies it to the output data selecting unit 107. At this time, the output data selecting unit 107 is in a state in which it selects the information output data DOA supplied from the information data processing unit 113 on the basis of the data selective control signal XS supplied from the operation control unit 95. Thus, the information output data DOA selected on the basis of the data selective control signal XS is allowed to pass through the output data selecting unit 107, and is led to an output terminal 114.

On the other hand, when information recording by the optical recording/reading head portion 45 is performed, the operation control unit 95 supplies the motor control signal XM to the servo-control signal forming unit 96 for the disk drive motor 80; a head control signal XHB to a serve-control signal forming unit 115 for the optical head portion 45; a recording laser power control command signal XPB to a power control signal forming unit 116 for the optical head portion 45; and the recording control signal XR to the recording signal forming unit 99. Also, the data information DR to be recorded on the other recording surface portion 15A of the disk 15 is supplied to the encoder unit 101 through the recording signal input terminal 100.

The encoder unit 101 encodes the data information DR in accordance with a specific encoding mode, to form the recording data DRC expressing the encoded data information DR. The recording data DRC thus obtained by the encoder unit 101 is supplied to the recording signal forming unit 99.

At this time, the recording signal forming unit 99 is in an operational state depending on the recording control signal XR supplied from the operation control unit 95. The recording signal forming unit 99 thus forms the recording information signal CSR on the basis of the recording data DRC supplied from the encoder unit 101 and supplies it to the laser light source 94 contained in the optical system in the optical head portion 45.

The power control signal forming unit 116 receives the recording laser power control command signal XPB from the operation control unit 95 and forms, on the basis of the recording laser power control command signal XPB, a power control signal CPB allowing the laser light source 94 contained in the optical system in the optical head portion 45 to generate laser light for forming a recording laser beam. The power control signal CPB thus obtained from the power control signal forming unit 116 is supplied to the laser light source 94 in the optical head portion 45.

The laser light source 94 in the optical head portion 45 generates laser light which has a relatively large power based on the power control signal CPB and which is modified in its intensity based on the recording information signal CSR. The optical system contained in the optical head portion 45 forms a recording laser beam on the basis of the laser light generated by the laser light source 94. The recording laser beam based on the recording information signal CSR is made incident on the other recording surface portion 15A of the disk 15 through the objective lens 90 contained in the optical system in the optical head portion 45.

In this case, the servo-control signal forming unit 96, to which the motor control signal XM is supplied from the operation control unit 95, forms the motor drive signal CM on the basis of the motor control signal XM and supplies it to the disk drive motor 80 through the motor drive unit 102.

The disk drive motor 80 is rotated on the basis of the motor drive signal CM, to rotate the disk mounting portion 40 mounting the disk 15 at a specific rotational speed. As a result, the disk 15 mounted on the disk mounting portion 40 is rotated at the specific rotational speed with the central portion of the recording surface portion 15A taken as a rotational center.

When the disk drive motor 80 is rotated, the rotation detecting means represented by a frequency oscillator provided on the disk drive motor 80 generates a detection output signal SG regarding the rotational state of the disk drive motor 80, and supplies it to the servo-control signal forming unit 96. The motor drive signal CM supplied from the servo-control signal forming unit 96 is adjusted on the basis of the detection output signal SG supplied from the disk drive motor 80, to thereby perform a servo-control of the disk drive motor 80.

At this time, the servo-control signal forming unit 115, to which the head control signal XHB is supplied from the operation control unit 95, forms a head drive signal CHB on the basis of the head control signal XHB, and supplies it to the optical head drive mechanism 91 through a head drive unit 117. The head drive unit 117 and the optical head mechanism 91 form an optical head drive unit as a whole.

Like the optical head drive mechanism 71 used for information recording by the optical head portion 44, in the optical head drive mechanism 91, the head drive signal CHB is supplied from the head drive unit 117 to the head feed motor. The head feed motor is thus rotated on the basis of the head drive signal CHB. The rotation of the head feed motor is transmitted to a feed screw shaft 93 through a reduction gear portion in the optical head drive mechanism 91, to rotate the feed screw shaft 93 in the direction corresponding to the rotational direction of the head feed motor. As a result, the optical head portion 45 is moved in the horizontal direction along the feed screw shaft 93 on the basis of rotation of the feed screw shaft 93, to thus set the position of the optical head portion 45 with respect to the other recording surface portion 15A of the disk 15.

In this way, the disk 15 mounted on the disk mounting portion 40 is rotated and the optical head portion 45 is located at the position corresponding to that of the other recording surface portion 15A of the disk 15, and in such a state, the recording laser beam based on the recording information signal CSR supplied from the optical head portion 45 is made incident on the other recording surface portion 15A of the disk 15 through the objective lens 90, so that the data information DR supplied through the recording signal input terminal 100 is recorded from a setting position in the other recording surface portion 15A of the disk 15.

In such information recording, the recording laser beam incident on the other recording surface portion 15A of the disk 15 is reflected therefrom, and the laser beam thus reflected is returned from the other recording surface portion 15A of the disk 15 to the optical head portion 45 and is detected by an optical detecting portion contained in the optical system in the optical head portion 45. The optical head portion 45 generates a read output signal group QB on the basis of the detection output regarding the reflected laser beam, and supplies it to a read signal processing unit 118.

The read signal processing unit 118 forms, on the basis of the read output signal group QB, a tracking error signal STB and a focus error signal SFB regarding the recording laser beam incident on the other recording surface portion 15A of the disk 15. The tracking error signal STB indicates a deviation in incident position of the recording laser beam with respect to a portion of the other recording surface portion 15A where an annular recording track is to be formed. Besides, the focus error signal SFB indicates a degree of defocus as compared with a suitable focus state of the recording laser beam on the other recording surface portion 15A. The tracking error signal STB and the focus error signal SFB obtained from the read signal processing unit 118 are supplied to the servo-control signal forming unit 115.

The servo-control signal forming unit 115 forms a tracking control drive signal CTB based on the tracking error signal STB, a focus control drive signal CFB based on the focus error signal SFB, and a head drive signal CHB based on a low frequency range component of the tracking error signal STB.

The head drive signal CHB based on the low frequency range component of the tracking error signal STB is supplied through the head drive unit 117 to the optical head drive mechanism 91 forming the optical head drive unit in co-operation with the head drive unit 117. In the optical head drive mechanism 91, the head drive signal CHB based on the low frequency range component of the tracking error signal STB from the head drive unit 117 is supplied to the head feed motor, to rotate the head feed motor on the basis of the head drive signal CHB. This causes the optical head portion 45 to be moved in the horizontal direction along the feed screw shaft 93 rotated in accordance with rotation of the head feed motor and to be continuously displaced in the radial direction of the disk 15 along with rotation of the disk 15 in the range restricted by the opening portion 22B provided in the above-described movable body 22. To move the optical head portion 45 up to a specific position, the head drive signal CHB is formed on the basis of the head control signal XHB supplied from the operation control unit 95.

The tracking control drive signal CTB is supplied through a tracking control drive unit 119 to the tracking coil additionally provided on the objective lens 90 of the optical head portion 45. The tracking coil allows the objective lens 90 to be finely moved, on the basis of the tracking control drive signal CTB, in the direction substantially parallel to the movement direction of the optical head portion 45 along the radial direction of the disk 15, that is, in the horizontal direction (shown by the arrow H) substantially perpendicular to the vertical direction.

The fine movement of the objective lens 90 allows a spot formed on the other recording surface portion 15A of the disk 15 by the recording laser beam being made incident thereon through the objective lens 90 from the optical head portion 45 to be finely displaced in the tracking direction. This controls a tracking state in which the recording laser beam incident through the objective lens 90 on the other recording surface portion 15A of the disk 15 reaches an annular recording track in the other recording surface portion 15A of the disk 15.

The focus control drive signal CFB is supplied through a focus control drive unit 120 to the focus coil additionally provided on the objective lens 90 of the optical head portion 45. The focus coil allows the objective lens 90 to be finely moved close to or apart from the other recording surface portion 15A of the disk 15 on the basis of the focus control drive signal CFB.

The fine movement of the objective lens 90 finely changes a degree of focus of the recording laser beam incident on the other recording surface portion 15A of the disk 15 through the objective lens 90, and thus controls a focus state of the recording laser beam incident through the objective lens 90 on the other recording surface portion 15A of the disk 15.

When information is read by the optical recording/reading head portion 45, the operation control unit 95 supplies the motor control signal XM to the servocontrol signal forming unit 96 for the disk drive motor 80, the head control signal XHB to the servo-control signal forming unit 115 for the optical head portion 45, and the reading laser power control command signal XPB to the power signal forming unit 116 for the optical head portion 45. Also the data selective control signal XS is supplied to the output data selecting unit 107.

The power control signal forming unit 116 receives the reading laser power command signal XPB from the operation control unit 95 and forms, on the basis of the reading laser power control command signal XPB, the power control signal CPB allowing the laser light source 94 contained in the optical system in the optical head portion 45 to generate laser light for forming a reading laser beam. The power control signal CPB thus obtained from the power control signal forming unit 116 is supplied to the laser light source 94 in the optical head 45. In addition, when information is read by the optical recording/reading head portion 45, the recording information signal CSR from the recording signal forming unit 99 is not supplied to the laser light source 94 in the optical head portion 45.

The laser light source 94 of the optical head portion 45 generates laser light of a specific intensity having a relatively small power based on the power control signal CPB, and the optical system contained in the optical head portion 45 forms a reading laser beam based on the laser light generated by the optical head portion 45. The reading laser beam is made incident on the other recording surface portion 15A of the disk 15 through the objective lens 90 contained in the optical system in the optical head portion 45.

Like the above-described information recording by the optical recording/reading head portion 45, the disk 15 mounted on the disk mounting portion 40 is rotated at a specific rotational speed on the basis of the motor control signal XM supplied from the operation control unit 95; a servo-control for the disk drive motor 80 is performed; and the optical head portion 45 is positioned with respect to the other recording surface portion 15A of the disk 15 on the basis of the head control signal XHB supplied from the operation control unit 95.

In this way, the disk 15 mounted on the disk mounting portion 40 is rotated and the optical head portion 45 is positioned with respect to the other recording surface portion 15A of the disk 15, and in such a state, a reading laser beam of a specific intensity having a relatively small power is made incident from the optical head portion 45 on the other recording surface portion 15A of the disk 15 through the objective lens 90, so that information recorded in the form of the annular recording tracks is read from a setting position in the other recording surface portion 15A of the disk 15.

Upon such information reading, the reading laser beam incident on the other recording surface portion 15A of the disk 15 is reflected therefrom and is returned from the other recording surface portion 15A of the disk 15 to the optical head portion 45, to be thus detected by an optical detecting portion contained in the optical system in the optical head portion 45. The optical head portion 45 generates a read output signal group QB on the basis of the detection output regarding the reflected laser beam, and supplies it to the read signal processing unit 118.

The read signal processing unit 118 forms, on the basis of the read output signal group QB, a tracking error signal STB and a focus error signal SFB regarding the reading laser beam incident on the other recording surface portion 15A of the disk 15. The tracking error signal STB indicates a deviation in incident position of the reading laser beam with respect to the annular recording track formed in the other recording surface portion 15A. The focus error signal SFB indicates a degree of defocus as compared with a suitable focus state of the reading laser beam on the other recording surface portion 15A. The read signal processing unit 118 also forms a read information signal SIB indicating information read from the annular recording track formed on the other recording surface portion 15A of the disk 15.

Both the tracking error signal STB and the focus error signal SFB thus obtained from the read signal processing unit 118 are supplied to the servo-signal forming unit 115. Like information recording by the optical recording/reading head portion 45, the optical head portion 45 is moved, on the basis of both the tracking error signal STB and the focus error signal SFB, in the horizontal direction along the feed screw shaft 93 rotated in accordance with rotation of the head feed motor, and is continuously displaced in the radial direction of the disk 15 along with rotation of the disk 15 in a range restricted by the opening portion 22B provided in the above-described movable body 22. The objective lens 90 is also finely moved in the direction substantially parallel to the movement direction of the optical head portion 45 along the radial direction of the disk 15, that is, in the horizontal direction (shown by the arrow H) substantially perpendicular to the vertical direction. This controls a tracking state in which the reading laser beam incident through the objective lens 90 on the other recording surface portion 15A of the disk 15 reaches an annular recording track in the other recording surface portion 15A of the disk 15. The objective lens 90 is also finely moved close to or apart from the other recording surface portion 15A of the disk 15, to thus control a focus state of the reading laser beam incident through the objective lens 90 on the other recording surface portion 15A of the disk 15.

The read information signal SIB obtained by the read signal processing portion 118 is amplified and waveform-equalized by an amplifying unit 121 and then supplied to a data discriminating unit 122 and a clock reproducing unit 123. The clock reproducing unit 123 reproduces a clock signal CKB on the basis of a data clock in the read information signal SIB, and supplies it to the data discriminating unit 122.

The data discriminating unit 122 discriminates data of the read information signal SIB on the basis of the clock signal CKB, to generate a digital information data DIB based on the read information signal SIB. The digital information data DIB generated at the data discriminating unit 122 is supplied to a decoder unit 124. At the decoder unit 124, the digital information data DIB is decoded to generate a reproduced information data DB and a reproduced address data DADB on the basis of the digital information data DIB.

The reproduced address data DADB obtained by the decoder unit 124 is supplied to an address data processing unit 125. The address data processing unit 125 forms an address output data DDB on the basis of the reproduced address data DADB, and supplies it to the operation control unit 95. The address output data DDB is used for control of a position of the optical head portion 45 with respect to the other recording surface portion 15A of the disk 15.

The reproduced information data DB obtained by the decoder unit 124 is supplied to an information data processing unit 126. The information data processing unit 126 forms an information output data DOB on the basis of the reproduced information data DB, and supplies it to the output data selecting unit 107. At this time, the output data selecting unit 107 is in a state in which it selects the information output data DOB supplied from the information data processing unit 126 on the basis of the data selective control signal XS supplied from the operation control unit 95. Thus, the information output data DOB selected on the basis of the data selective control signal XS is allowed to pass through the output data selecting unit 107, and is led to an output terminal 114.

In this embodiment, the recording signal forming unit 99, recording signal input terminal 100, and encoder unit 101 are common to the optical head portions 44 and 45; however, those corresponding to the recording signal forming unit 99, recording signal input terminal 100, and encoder unit 101 are used for each of the optical head portions 44 and 45. In such a case, information recording can be simultaneously performed for both the recording surface portions 15A provided on both the surfaces of the body of the disk 15.

Next, there will be described a manner of taking off the cartridge 18 containing the disk 15 to or from which information has been recorded or read in the manner described above from the cartridge housing portion 16. The motor 37 provided commonly to the rack portions 35 provided on the upper and lower sliders 26 and 27 is, for example, reversely rotated for a specific period of time. This causes the upper and sliders 26 and 27 to be moved in the direction opposed to the direction HA, that is, the insertion direction of the cartridge 18, so that both the movable body 22 and the cartridge holder 20 housing the cartridge 18 are moved in the direction where they are separated from the fixed body 21. Consequently, as shown in FIG. 6, the disk 15 contained in the cartridge 18 is located at a position where the disk 15 is separated from the disk mounting portion 40 and the disk clamp portion 41.

In such a state, the pair of lock members 53 provided on the cartridge holder 20 are released, using a lock releasing mechanism (not shown), from engagement with the pair of recessed portions 18B provided in the cartridge 18. Thus, the movable arm member 48, which has been located at the position to keep opening of the movable lid member 19 provided on the cartridge 18 as shown in FIG. 5, is turned in the direction along which the movable arm member 48 is biased by the biasing force of the toggle spring 52, causing the cartridge 18 housed in the cartridge housing portion 16 to be moved in the horizontal direction (shown by the arrow H). As a result, the cartridge 18 is discharged from the cartridge housing portion 16 through the rear opening portion 20A formed in the cartridge holder 20. Along with the movement of the cartridge 18, the movable lid member 19 is moved, by the biasing force of the spring member (not shown) of the cartridge 18, along the slide groove 17 up to a position at which the movable lid member 19 closes the opening portion 18A provided in the cartridge 18.

Accordingly, the portion including the motor 37; upper and lower sliders 26 and 27; movable body 22 provided with the disk clamp portion 41, and reference pins 59 and 61; and the cartridge holder 20 provided with the lock members 53 not only positions and supports the cartridge 18 inserted in the cartridge housing portion 16 along the horizontal direction (shown by the arrow H), but also functions as a movable mechanism for selectively moving the cartridge 18 close to or apart from the disk mounting portion 40. The portion of the cartridge holder 20 forming such a movable mechanism, including the movable arm member 48, slot 50, and toggle spring 52, functions as a lid member control portion which is engaged with the movable lid member 19 provided on the cartridge 18 inserted in the cartridge housing portion 16, to thereby allow the movable lid member 19 to selectively close or open the opening portion 18A provided in the cartridge 18 in accordance with the movement of the cartridge 18 in the horizontal direction.

Figure 13:
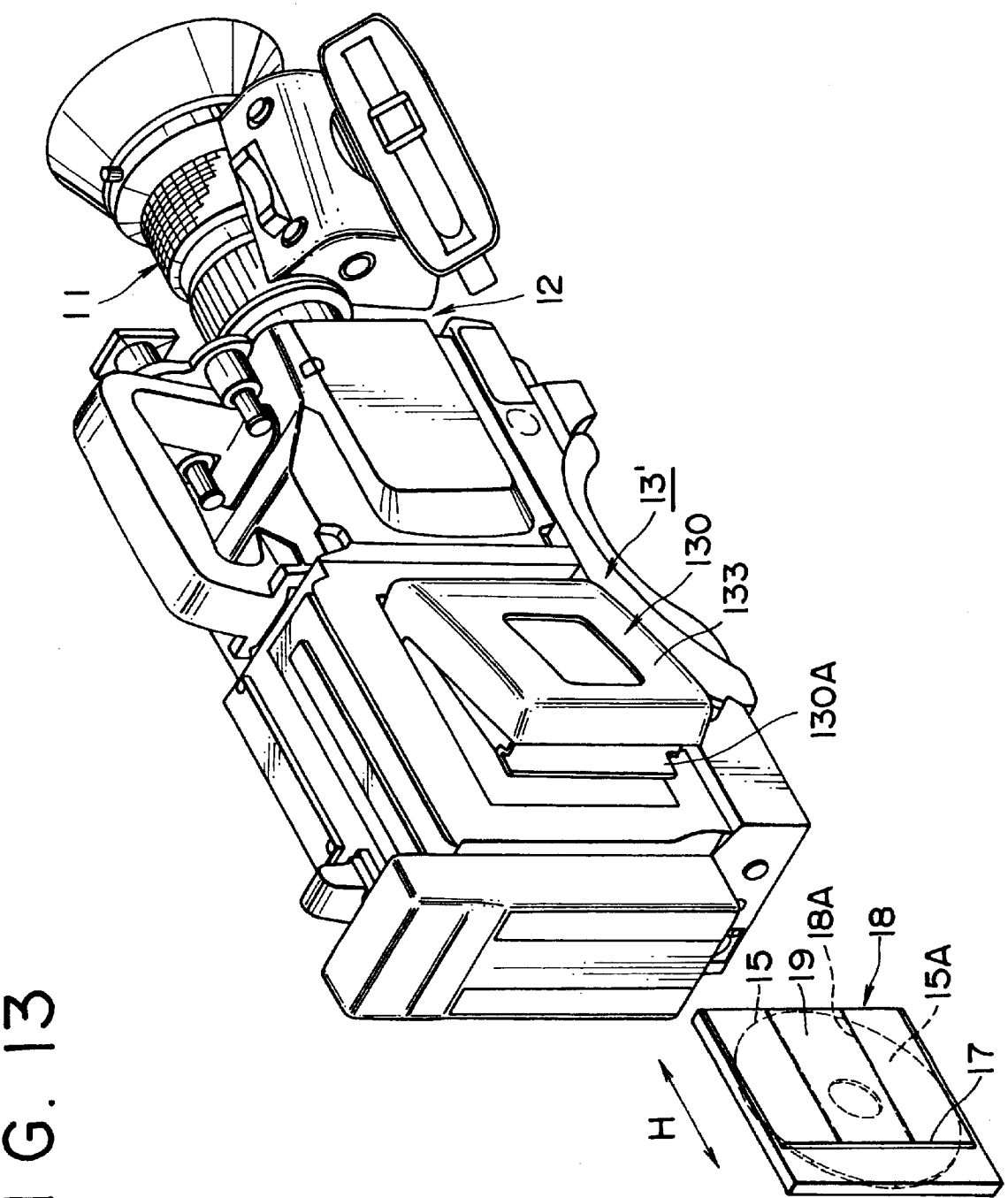
FIG. 13 is a perspective view showing a portable type video and audio recording/reproducing apparatus to which another embodiment of the information recording/reproducing device of the present invention is applied.

FIG. 13 shows a portable type video and audio recording/reproducing apparatus to which another embodiment of the information recording/reproducing device of the present invention is applied. In this example, an information recording/reproducing device 13' is integrated with the portable type video and audio recording/reproducing device similar to that shown in FIG. 1. In FIG. 13, parts and members corresponding to those shown in FIGS. 1, 4 and 5 are indicated by the characters common to those in FIGS. 1, 4 and 5, and the overlapping explanation thereof is omitted.

Figure 14:
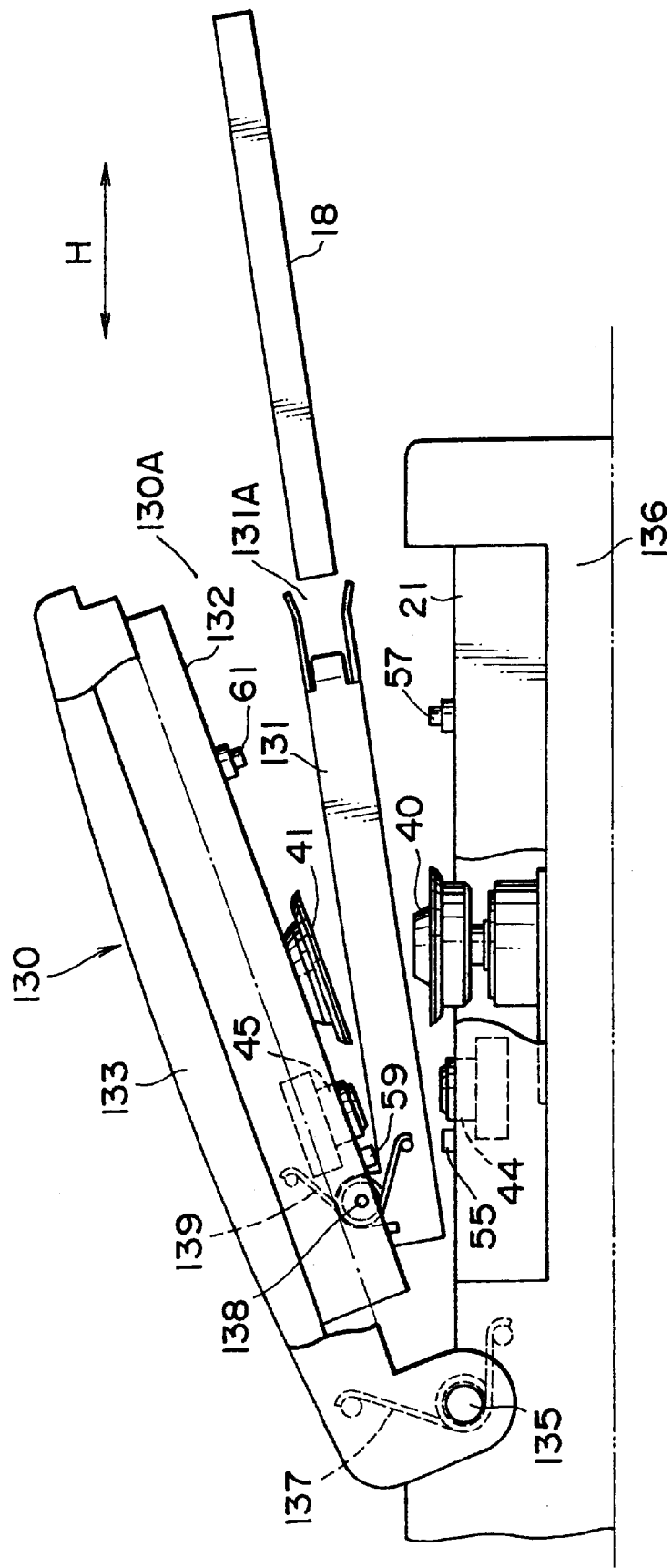
FIG. 14 is a side view of a cartridge housing portion used for another embodiment of the information recording/reproducing device of the present invention.

The information recording/reproducing device 13' in FIG. 13 includes a cartridge housing portion 130. FIG. 14 shows a detailed configuration of the cartridge housing portion 130. In FIG. 14, parts and members corresponding to those shown in FIGS. 6 and 7 are indicated by the characters common to those shown in FIGS. 6 and 7, and the over lapping explanation thereof is omitted. Like the cartridge housing portion 16 shown in FIG. 1, a cartridge 18 containing a disk 15 as one example of a writable disk-like recording medium and provided with a movable lid member 19 is inserted into the cartridge housing portion 130 through a rear opening portion 130A provided in a rear wall portion thereof in the direction substantially perpendicular to the vertical direction, that is, in the horizontal direction (shown by the arrow H).

The cartridge housing portion 130 includes a cartridge holder 131 provided with a rear opening portion 131A, a fixed body 21 provided with a disk mounting portion 40 and an optical recording/reading head portion 44, a movable body 132 provided with a disk clamp portion 41 and an optical recording/reading head portion 45, and an opening/closing mechanism including a lid portion 133 mounted with the movable body 132. The cartridge holder 131 has a configuration being substantially similar to that of the cartridge holder 20 shown in FIGS. 4 and 5, except that the cartridge holder 131 has no pins corresponding to the pair of engaging pins 28 and the pair of engaging pins 29. The movable body 132 also has a configuration being substantially similar to that of the movable body 22 shown in FIGS. 6 and 7, except that the movable body 132 has no pins corresponding to the pair of engaging pins 30 and the pair of engaging pins 31.

The lid portion 133 mounted with the movable body 132 is turnably mounted through a shaft 135 on a chassis 136 provided with the fixed body 21. A toggle spring 137 with both end portions thereof mounted to the lid member 133 and the chassis 136 is wound around the shaft 135 for biasing the lid member 133 in the direction in which the rear opening portion 130A of the cartridge housing portion 130 is opened. The cartridge holder 131 has a rear opening portion 131A connected to the rear opening portion 130A of the cartridge housing portion 130, and it is turnably mounted on the movable body 132 through a shaft 138. A toggle spring 139 with both end portions thereof mounted to the cartridge holder 131 and the movable body 132 is wound around the shaft 138. The cartridge holder 131 is biased by the toggle spring 139 in the direction in which an end portion thereof provided with the rear opening portion 131A is separated from the movable body 132. It should be noted that the cartridge holder 131 may be turnably mounted not on the movable body 132 but on the fixed body 21 in such a manner as to be biased by a spring equivalent to the toggle spring 139 in the direction in which the end portion thereof provided with the rear opening portion 131A is separated from the fixed body 21.

In the cartridge housing portion 130 provided with the lid member 133, when mutual engagement between the lid member 133 and a lock mechanism (not shown) is released, the lid member 133 is turned around the shaft 135 by the biasing force of the toggle spring 137, and thereby the rear opening portion 130A comes to be in an opening state in which the fixed body 21, cartridge holder 131, and movable body 132 are exposed to the exterior. In such a state, the cartridge holder 131 is turned around the shaft 138 by the biasing force of the toggle spring 138, and as shown in FIG. 14, it is tilted at a specific angle with respect to each of the fixed body 21 and the movable body 132 so that the disk mounting portion 40 provided on the fixed body 21 is separated at a relatively large distance from the disk clamp portion 41 provided on the movable body 132.

In such a state, the cartridge 18 containing the disk 15 and having an opening portion 18A closed by the movable lid member 19 is inserted, with a U-shaped bent portion of the movable lid member 19 at the head, in the horizontal direction (shown by the arrow H) into the cartridge holder 131 of the cartridge housing portion 130 through the rear opening portion 130A of the cartridge housing portion 130 and the rear opening portion 131A of the cartridge holder 131 connected to the rear opening portion 130A.

Along with the horizontal movement of the cartridge 18 inserted in the cartridge holder 131, a lid member control portion of the cartridge holder 131 moves the movable lid member 19 provided on the cartridge 18, like the lid member control portion including the movable arm member 48 and the toggle spring 52 shown in FIGS. 4 and 5, to thereby open an opening portion 18A provided in the cartridge 18. Consequently, when the cartridge 18 is housed in the cartridge holder 131, the movable lid member 19 is located at a position at which recording surface portions 15A provided on both surfaces of a body of the disk 15 contained in the cartridge 18 are exposed to the exterior through the opening portion 18A provided in the cartridge 18, and also a pair of lock members provided on the cartridge holder 131 position and support the cartridge 18 housed in the cartridge holder 131, like the pair of lock members 53 shown in FIGS. 4 and 5.

Like the cartridge housing portion 16 shown in FIG. 1, even in the cartridge housing portion 130, the cartridge 18 is inserted in the cartridge holder 131 in the horizontal direction (shown by the arrow H) and positioned and supported therein. Accordingly, the disk 15 with the recording surface portions 15A exposed to the exterior through the opening portion 18A provided in the cartridge 18 is positioned between on the fixed body 21 side provided with the disk mounting portion 40 and the optical recording/reading head portion 44 and on the movable body 132 side provided with the disk clamp portion 41 and the optical recording/reading head portion 45 in a state in which the recording surface portions 15A are located substantially within a vertical plane. In this state, the disk 15 is suitably opposed to the disk mounting portion 40 and the disk clamp portion 41.

In the state in which the cartridge 18 containing the disk 15 is housed in the cartridge holder 131, the lid member 133 is turned in the direction against the biasing force of the toggle spring 137 to close the rear opening portion 130A provided in the cartridge housing portion 130 for shielding from the exterior the fixed body 21, cartridge holder 131 housing the cartridge 18, and movable body 132. The turning of the lid member 133 causes the movable body 132 and the cartridge holder 131 housing the cartridge 18 to be moved close to the fixed body 21. Thus, the disk 15 contained in the cartridge 18 is pressed by the disk clamp portion 41 in a state in which the recording surface portions 15A provided on both the surfaces of the body of the disk 15 are located within the vertical plane, to be thus mounted on the disk mounting portion 40.

The closing state of the rear opening portion 130A of the cartridge housing portion 130 for mounting the disk 15 contained in the cartridge 18 on the disk mounting portion 40 is kept by mutual engagement between the lid member 133 and the lock mechanism (not shown).

Accordingly, a portion including the lid member 133 applied with the biasing force of the toggle spring 137, movable body 132 mounted on the lid member 133, and cartridge holder 131 not only position and support the cartridge 18 inserted in the cartridge housing portion 130 along the horizontal direction (shown by the arrow H) but also functions as a movable mechanism for selectively moving the cartridge 18 close to or apart from the disk mounting portion 40.

Like the information recording/reproducing device 13 shown in FIG. 1, the information recording/reproducing device 13' including the cartridge housing portion 130 provided with the lid member 133 is allowed to record or read information into or from the disk 15 mounted on the disk mounting portion 40.

In each of the embodiments, the recording surface portions are provided on both the surfaces of a body of a writable disk-like recording medium contained in the cartridge; however, according to the information recording/reproducing device of the present invention, one recording surface portion may be provided on one surface of a body of a writable disk-like recording medium contained in the cartridge. In such a case, of the fixed body and movable body, for example, on the fixed body is provided the optical recording/reading head portion, and information is recorded or reproduced into or from the disk-like recording medium using the optical head portion.

In each of the embodiments, there is shown the information recording/reproducing device of the present invention in which information can be recorded or reproduced into or from a writable disk-like recording medium; however, the present invention can be also applied to an information recording device in which information can be only recorded into a writable disk-like recording medium. One example of such an information recording device of the present invention is equivalent to a modification of the information recording/reproducing device of the present invention shown in FIG. 11 in which each of the optical recording/reading head portions 44 and 45 is modified into an optical recording-only head portion.

In each of the embodiments of the information recording/reproducing device of the present invention and other possible modifications, the optical recording/reading head portion 44 or 45 including the objective lens 70 or 90 opposed to one or the other recording surface portion of an "upright" disk-like recording medium, for example, the disk 15 mounted on the disk mounting portion 40 with the recording surface portions 15A located substantially within the vertical plane, is adjusted by the tracking control portion including the tracking coil such that the objective lens 70 or 90 is moved in the direction substantially parallel to the vertical direction along the radial direction of the disk-like recording medium, to thereby control a tracking state in which a recording laser beam incident on one or the other recording surface portion of the disk-like recording medium reaches a recording track in the recording surface portion of the disk-like recording medium.

Such a tracking control can be achieved without any special configuration of the cartridge containing the disk-like recording medium upon recording of information on one or the other recording surface portion of the disk-like recording medium by the optical recording/reading head portion 44 or 45 including the objective lens 70 or 90. To be more specific, the tracking control portion including the tracking coil allows the objective lens 70 or 90 to be moved in the tracking direction within a vertical plane parallel to the vertical plane in which the recording surface portions of the disk-like recording medium are located, that is, in the direction substantially perpendicular to the vertical direction. As a result, the objective lens 70 or 90 is in a state in which it is less susceptible to a stationary displacement of the gravity and an accidental displacement due to vertical vibration applied to the apparatus, that is, it is in a stable state without occurrence of an undesirable displacement.

In each of the embodiments shown in FIGS. 1 and 13, the cartridge containing a disk-like recording medium represented by the disk 15 is inserted into the cartridge housing portion through the rear opening portion thereof in the direction substantially perpendicular to the vertical direction; however, according to the information recording/ reproducing device of the present invention, the cartridge housing portion may be provided with a front opening portion and the cartridge containing the disk-like recording medium may be inserted in the cartridge housing portion through the front opening portion thereof in the direction substantially perpendicular to the vertical direction. In such a case, the cartridge holder disposed between the movable body and the fixed body is also provided with a front opening portion connected to the front opening portion provided in the cartridge housing portion.

What is claimed is:

1. An information recording device comprising:
   a disk mounting portion on which a disk-like recording medium contained in a cartridge is mounted with a recording surface portion of said disk-like recording medium located substantially within a vertical plane in such a manner as to be rotatable with a central portion of said recording surface portion taken as a rotational center;
   an optical head portion including an objective lens disposed opposite to said recording surface portion of said disk-like recording medium mounted on said disk mounting portion and allowing a light beam for recording information to be made incident on said recording surface portion through said objective lens;
   an optical head drive portion for moving said optical head portion along the radial direction of said disk-like recording medium mounted on said disk mounting portion;
   a tracking control portion for moving said objective lens in the direction substantially parallel to the movement direction of said optical head portion along the radial direction of said disk-like recording medium, thereby controlling a tracking state in which the light beam incident through said objective lens on said recording surface portion of said disk-like recording medium mounted on said disk mounting portion reaches a recording track in said recording surface portion; and
   a cartridge housing portion for housing and supporting said cartridge containing said disk-like recording medium when said disk-like recording medium is mounted on said disk mounting portion;
   wherein when said disk-like recording medium is mounted on said disk mounting portion, said cartridge containing said disk-like recording medium is inserted in said cartridge housing portion in the direction crossing the vertical direction, and the movement of said objective lens by said tracking control portion with respect to said disk-like recording medium mounted on said disk mounting portion in the state in which said cartridge is supported by said cartridge housing portion is performed in the direction substantially perpendicular to the vertical direction.

2. An information recording device according to claim 1, wherein when said disk-like recording medium is mounted on said disk mounting portion, said cartridge containing said disk-like recording medium is inserted into said cartridge housing portion in the direction substantially perpendicular to the vertical direction.

3. An information recording device according to claim 1, wherein said cartridge housing portion positions said cartridge inserted thereto in the direction crossing the vertical direction, and said cartridge housing portion includes a rotatable mechanism for selectively rotating said cartridge positioned by said cartridge housing portion close to or apart from said disk mounting portion.

4. An information recording device according to claim 3, wherein said rotatable mechanism includes a lid member control portion which is engaged with a movable lid member provided on said cartridge inserted into said cartridge housing portion in the direction crossing the vertical direction and which allows said movable lid member to be selectively located, in accordance with movement of said cartridge in the direction crossing the vertical direction, at a position where said movable lid member opens an opening portion formed in said cartridge for exposing said disk-like recording medium to the exterior through said opening portion or at a position where said movable lid member closes said opening portion.

5. An information recording/reproducing device comprising:
   a disk mounting portion on which a disk-like recording medium contained in a cartridge is mounted with a recording surface portion of said disk-like recording medium located substantially within a vertical plane in such a manner as to be rotatable with a central portion of said recording surface portion taken as a rotational center;
   an optical head portion including an objective lens disposed opposite to said recording surface portion of said disk-like recording medium mounted on said disk mounting portion and selectively making incident a light beam for recording information or a light beam for reading information on said recording surface portion through said objective lens;
   an optical head drive portion for moving said optical head portion along the radial direction of said disk-like recording medium mounted on said disk mounting portion;
   a tracking control portion for moving said objective lens in the direction substantially parallel to the movement direction of said optical head portion along the radial direction of said disk-like recording medium, thereby controlling a tracking state in which the light beam incident through said objective lens on said recording surface portion of said disk-like recording medium mounted on said disk mounting portion reaches a recording track in said recording surface portion; and a cartridge housing portion for housing and supporting said cartridge containing said disk-like recording medium when said disk-like recording medium is mounted on said disk mounting portion;

wherein when said disk-like recording medium is mounted on said disk mounting portion, said cartridge containing said disk-like recording medium is inserted in said cartridge housing portion in the direction crossing the vertical direction, and the movement of said objective lens by said tracking control portion with respect to said disk-like recording medium mounted on said disk mounting portion in the state in which said cartridge is supported by said cartridge housing portion is performed in the direction substantially perpendicular to the vertical direction.

6. An information recording/reproducing device according to claim 5, wherein when said disk-like recording medium is mounted on said disk mounting portion, said cartridge containing said disk-like recording medium is inserted into said cartridge housing portion in the direction substantially perpendicular to the vertical direction.

7. An information recording/reproducing device according to claim 5, wherein said cartridge housing portion positions said cartridge inserted thereto in the direction crossing the vertical direction, and said cartridge housing portion includes a rotatable mechanism for selectively rotating said cartridge positioned by said cartridge housing portion close to or apart from said disk mounting portion.

8. An information recording/reproducing device according to claim 7, wherein said rotatable mechanism includes a lid member control portion which is engaged with a movable lid member provided on said cartridge inserted into said cartridge housing portion in the direction crossing tho vertical direction and which allows said movable lid member to be selectively located, in accordance with movement of said cartridge in the direction crossing the vertical direction, at a position where said movable lid member opens an opening portion formed in said cartridge for exposing said disk-like recording medium to the exterior through said opening portion or at a position where said movable lid member closes said opening portion.

\* \* \* \* \*